US005541400A

United States Patent [19]

Hagiwara et al.

[11] Patent Number: 5,541,400

[45] Date of Patent: Jul. 30, 1996

[54] ACCUMULATION CONTROL APPARATUS FOR PHOTOELECTRIC CONVERSION ELEMENT AND VISUAL AXIS DETECTION APPARATUS USING THE ELEMENT

[75] Inventors: Shinichi Hagiwara; Akira Yamada; Yoshiaki Irie, all of Yokohama, Japan

[73] Assignee: Canon Kabushiki Kaisha, Tokyo, Japan

[21] Appl. No.: 142,062

[22] Filed: Oct. 28, 1993

[30] Foreign Application Priority Data

Oct. 29, 1992 [JP] Japan .................................. 4-312680
Oct. 30, 1992 [JP] Japan .................................. 4-293019

[51] Int. Cl.[6] .............................. G03B 3/00; H04N 5/335

[52] U.S. Cl. ........................ 250/208.1; 354/410; 348/297

[58] Field of Search ............................ 250/201.2, 208.1, 250/208.2, 208.3, 201.6, 201.7, 201.8, 214 AG, 214 AL, 214 B, 214 P; 348/78, 257, 297, 298; 354/402, 410

[56] References Cited

U.S. PATENT DOCUMENTS

| | | | |
|---|---|---|---|
| 4,479,062 | 10/1984 | Kawasaki et al. | 250/208.1 |
| 4,584,656 | 4/1986 | Sakai et al. | 348/297 |
| 4,701,626 | 10/1987 | Ishizaki et al. | 250/208.3 |
| 5,182,447 | 1/1993 | Nakayama | 250/208.1 |
| 5,182,658 | 1/1993 | Ishizaki et al. | 348/297 |
| 5,214,466 | 5/1993 | Nagano et al. | 354/402 |
| 5,272,328 | 12/1993 | Furukawa | 250/208.1 |
| 5,402,199 | 3/1995 | Akashi | 354/410 |

FOREIGN PATENT DOCUMENTS

| | | |
|---|---|---|
| 1-274736 | 11/1989 | Japan . |
| 2-65835 | 3/1990 | Japan . |

*Primary Examiner*—Edward P. Westin
*Assistant Examiner*—John R. Lee
*Attorney, Agent, or Firm*—Fitzpatrick, Cella, Harper & Scinto

[57] ABSTRACT

An apparatus includes a photoelectric conversion device having a plurality of photoelectric conversion elements for converting light to photoelectric conversion signals and for transferring the photoelectric conversion signals to adjacent photoelectric conversion elements. The apparatus also includes a transfer speed changing device for changing a transfer speed during a period of an accumulation operation of the photoelectric conversion device, making it possible to measure the luminance of an eye exactly in a short period of time.

11 Claims, 22 Drawing Sheets

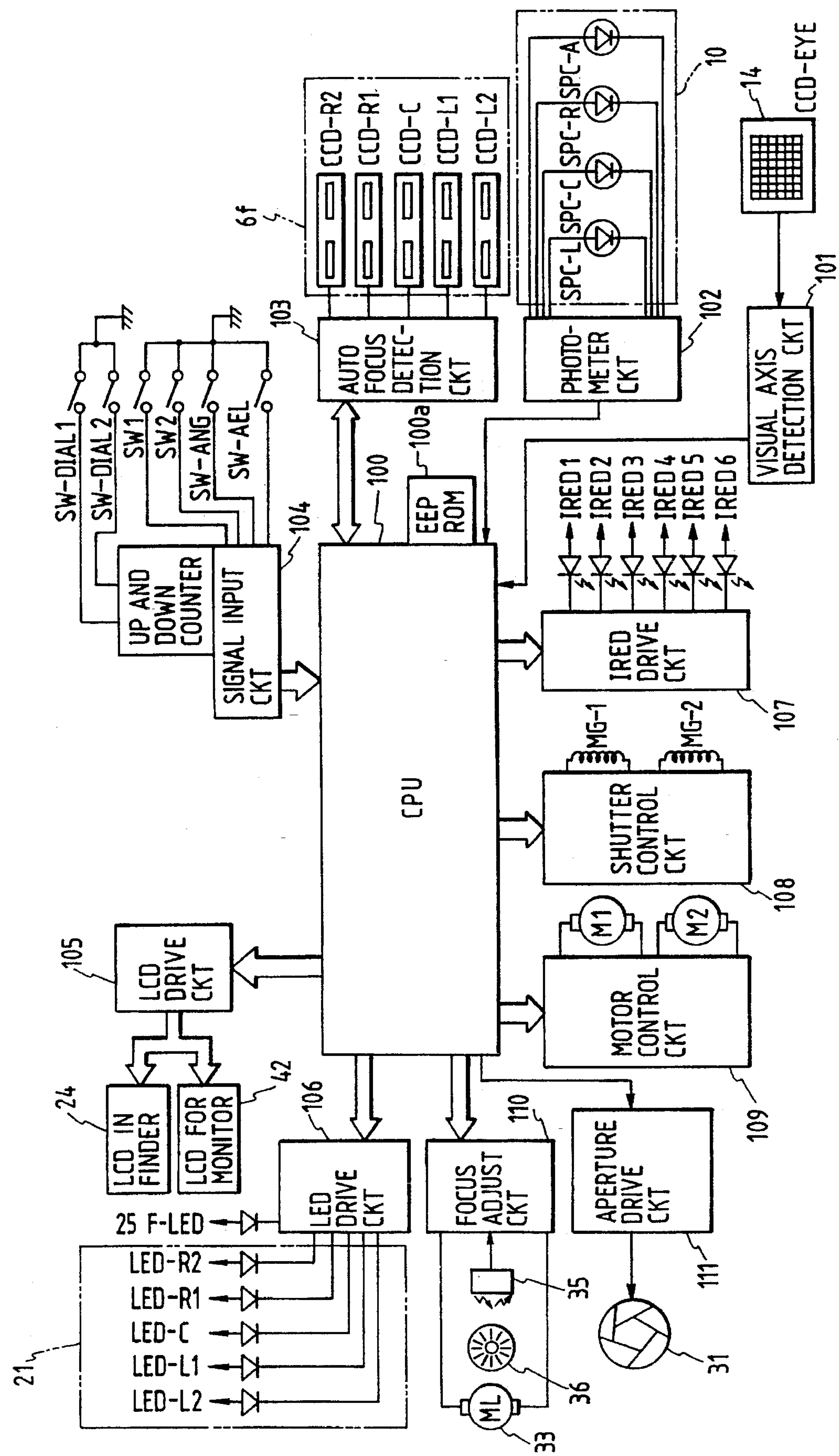
FIG. 4
CPU
AUTO FOCUS DETECTION CKT
PHOTO-METER CKT
VISUAL AXIS DETECTION CKT
EEP ROM
SIGNAL INPUT CKT
UP AND DOWN COUNTER
IRED DRIVE CKT
SHUTTER CONTROL CKT
MOTOR CONTROL CKT
LCD DRIVE CKT
LCD IN FINDER
LCD FOR MONITOR
LED DRIVE CKT
FOCUS ADJUST CKT
APERTURE DRIVE CKT
CCD-R2
CCD-R1
CCD-C
CCD-L1
CCD-L2
SPC-L
SPC-C
SPC-R
SPC-A
CCD-EYE
SW-DIAL1
SW-DIAL2
SW1
SW2
SW-ANG
SW-AEL
IRED 1
IRED 2
IRED 3
IRED 4
IRED 5
IRED 6
MG-1
MG-2
M1
M2
ML
25 F-LED
LED-R2
LED-R1
LED-C
LED-L1
LED-L2

| FIG. 5A |
| --- |
| FIG. 5B |

B
A
DETECT FOCAL POINT
107
CAN MEASURING DISTANCE BE MEASURED ?
108
NO
YES
118
DISPLAY DISTANCE NG
ON
SW1 ?
119
OFF
IN-FOCUS ?
109
NO
YES
110
DISPLAY IN-FOCUS
117
DRIVE LENS
OFF
SW1 ?
111
ON
PHOTOMETRY
112
OFF
SW2 ?
113
ON
RELEASE SHUTTER
114

SIMG
SSTR
OFD
IMPXL
STPXL
HSHIFT
φHO
VCC
GND
SAMP
SOUT
φRO
VOB
OFDDRV
φVO
VDRV

SIMG
SSTR
L PIXEL
L/4 PIXEL
L/4 PIXEL
L/4 PIXEL
L/4 PIXEL
SIMGB 1
SIMGB 2
SIMGB 3
SIMGB 4
SIMGB 5
SIMGB 6
SIMGB 7
SIMGB 8
SIMGB 9
SIMGB10
SIMGB 11
SIMGB 12
K/3 PIXEL
K/3 PIXEL
K/3 PIXEL
K PIXEL
HSHIFT

L PIXEL
1 LINE
SIMG
(K/3)+1 LINE
(2K/3)+1 LINE
K LINE
SSTR
STLLOW
SIMGBV 1
SIMGBV 2
SIMGBV 3
HSHIFT
K/3 PIXEL
K/3 PIXEL
K/3 PIXEL
K PIXEL

SIMG
SSTR
L PIXEL
L/4 PIXEL
L/4 PIXEL
L/4 PIXEL
L/4 PIXEL
SIMGBH 4
SIMGBH 3
SIMGBH 2
SIMGBH 1
HSHIFT
K PIXEL

AGC SEQUENCE
CLEAR
AGC 1
AGC 2
AGC 3
ACCUMULATE
V-TRANS
READ-OUT
K TIMES
L TIMES
φV
φH

ACCUMULATE
V-TRANS
READ-OUT
DRV-B
DRV-A
DRV-A
TRANSFER
CLEAR
R(1)
R(2)
R(L-1)
R(L)
P(1)
P(2)
P(K/3)
C(2,1)
C(1,1)
VT(1)
VC(1)
φVO
φHO

ACCUMULATE
V-TRANS
READ-OUT
DRV-A
DRV-B
DRV-A
TRANSFER
CLEAR
R(1)
R(2)
R(L-1)
R(L)
C(1,1)
P(1)
P(2)
P(K/3)
C(2,1)
VT(1)
VC(1)
φVO
φHO

READ-OUT
R(1)
R(2)
R(L-1)
R(L)
ACCUMULATE
V-TRANS
DRV-A
DRV-A
DRV-B
TRANSFER
CLEAR
C(1,1)
C(2,1)
P(1)
P(2)
P(K/3)
VT(1)
VC(1)
ϕVO
ϕHO

FIG. 17

| AGC TABLE | EYEBALL LUMINANCE VALUE Be | ACCUMULATION TIME ms | AMPLIFICATION COEFFICIENT (Gain) | CHARACTERISTIC |
|---|---|---|---|---|
| 1 | LESS THAN 1 | 20 | ×10 | NON-LINEAR |
| 2 | 1 to 2 | 15 | ×10 | NON-LINEAR |
| 3 | 2 to 4 | 10 | ×10 | NON-LINEAR |
| 4 | 4 to 8 | 14 | ×5 | NON-LINEAR |
| 5 | 8 to 12 | 10 | ×5 | NON-LINEAR |
| 6 | 12 to 18 | 6 | ×5 | LINEAR |
| 7 | 18 to 27 | 8 | ×2.5 | LINEAR |
| 8 | MORE THAN 27 | 5 | ×2.5 | LINEAR |

ACCUMULATION CONTROL APPARATUS FOR PHOTOELECTRIC CONVERSION ELEMENT AND VISUAL AXIS DETECTION APPARATUS USING THE ELEMENT

BACKGROUND OF THE INVENTION

1. Field of the Invention

The present invention relates to an accumulation control apparatus for photoelectric conversion elements to execute the accumulation control of the photoelectric conversion elements, which is suitably used for the visual axis (sight axis) detection apparatus, focal point detection apparatus, or the like for a camera using a sensor comprising photoelectric conversion elements, for example, and also, to a visual axis detection apparatus using such a control apparatus.

2. Related Background Art

Using photoelectric conversion elements, it is possible to obtain the electric signals corresponding to the irradiated luminous energy. However, for obtaining an optimal amount of the electric signals which can provide sufficient contrasts as required without the influence of the dark current, which is the output other than that due to irradiated luminous energy, the accumulation time must be controlled in accordance with the irradiated luminous energy within the electric signal capacitance capable of providing only a limited accumulation.

In general, therefore, when obtaining the information needed for the control of the accumulation time, the following operation should be executed as preparatory processes to secure an optimal amount of signals:

At first, an accumulation is executed for a specific period of accumulation time in advance in order to obtain an amount of signals. The amount of signals thus obtained will be read out per pixel from the photoelectric element.

Then, the signals are processed for the entire pixel outputs or for the pixels which constitute an area partially needed because the luminous energy is seldom uniformly irradiated to the photoelectric conversion elements for which the accumulation should be controlled.

Then, in an area having the optimum signal amount, the most optimal accumulation time that will be obtainable by the outputs of the electric signals of the required pixels is obtained from the average value of the pixel outputs as well as the accumulation time obtained on the basis of the results of the signal processing executed by per pixel unit, and then, the accumulation control is executed by the accumulation time thus obtained for the provision of the electric signals.

Also, in order to obtain the information required for controlling the accumulation time, it may be considered that the accumulation time is controllable by the application of the luminance information regarding an object in an optical equipment such as a camera which is provided with photometric means for measuring the luminance of the object.

In a conventional accumulation control apparatus such as mentioned above, the average value of the pixel outputs in an area required for the information thereby to control the accumulation time is read out per pixel, and provided by means of driving and signal processing for the control of the accumulation of the photoelectric conversion elements in order to obtain the optimal amount of signals. Consequently, the two-time accumulation, per-pixel read-out, and signal processing should be executed just to obtain the optimal image signals each time. Thus, it requires an enormous amount of time to complete them. Also, the dependence on pixel numbers is inevitably great, making it difficult to implement the appropriate measures for the high pixel arrangement.

Also, in utilizing this for the visual axis detection apparatus for a camera or the like, the time required for the visual axis detection occupies an extremely large ratio as compared to the other series of operational processes for the camera. As a result, not only because of the time needed for an apparatus which uses the information provided by the outputs of the photoelectric conversion elements, but also because of the lowered function of the system as a whole brought about by this imbalanced ratio of timing required to use such an accumulation control apparatus, the user feels extremely uncomfortable when operating this camera.

Now, in continuation, the description will be made of the visual axis detection apparatus.

In Japanese Patent Laid-Open application No. 1-274736, for example, the parallel luminous fluxes are projected from a light source to the anterior eye of an observer in order to obtain his visual axis by utilizing the reflection light each from the cornea reflection images and the image formation position of the pupil. Also, Japanese Patent Laid-Open Application No. 2-65835 proposes a method with which to detect the boundary between the cornea reflection images, the iris, and the pupil in an excellent precision in a stabilized condition by controlling the accumulation time per line using an apparatus capable of detecting the image information non-destructively.

FIG. 22 is a view illustrating the principle of the visual axis detection method. FIGS. 23A and 23B are views illustrating the eyeball image projected on the surface of the image sensor shown in FIG. 22, and the intensity of the output from the image sensor 14, respectively.

Now, in conjunction with FIG. 22, FIGS. 23A and 23B, the description will be made of a visual axis detection method. The infrared light emitting diodes 13*a* and 13*b* are arranged substantially symmetrical in the Z direction, respectively, with respect to the optical axis $ax_1$ of a light receiving lens 12. These diodes illuminate the eyeball of the photographer divergently.

The infrared light emitted from the infrared light emitting diode 13*b* illuminates the cornea 16 of the eyeball 15. At this juncture, the cornea reflection image d formed by a part of the infrared light reflected on the surface of the cornea 16 is converged by the light receiving lens 12, hence being reimaged at the position d' on the image sensor 14.

Likewise, the infrared light emitted from the infrared light emitting diode 13*a* illuminates the cornea 16 of the eyeball. At this juncture, the cornea reflection image e formed by a part of the infrared light reflected on the surface of the cornea 16 is converged by the light receiving lens 12, hence being reimaged at the position e' on the image sensor 14.

Also, the luminous fluxes from the end portions a and b of the iris 17 form the images of these end portions a and b at the positions a' and b' on the image sensor 14. When the rotation angle 8 of the optical axis $ax_2$ of the eyeball 15 is small with respect to the optical axis (optical axis $ax_1$) of the light receiving lens 12, the coordinates Xc of the central position c of the pupil 19 is expressed as follows provided that the Z coordinates of the end portions a and b of the iris are Xa and Xb:

$$Xc=(Xa+Xb)/2$$

Also, the Z coordinates of the center point of the cornea reflection images d and e agree with the Z coordinates $Z_O$ of the curvature center O of the cornea 16. Therefore, given the X coordinates at the positions d and e at which the cornea reflection images are generated as Xd and Xe; the standard distance from the curvature center 0 of the cornea 16 to the center C of the pupil 19 as $L_{oc}$; and the coefficient with which to consider the individual difference with respect to the distance $L_{oc}$ as A1, the rotation angle θ of the optical axis $ax_2$ of the eyeball almost satisfies the following relational equation:

$$(A1\times L_{OC})\times\sin\theta\simeq Xc-(Xd+Xe)/2 \quad (1)$$

Consequently, as shown in FIG. 23B, the rotation angle θ of the optical axis $ax_2$ of the eyeball can be obtained in the visual axis arithmetic processing unit by detecting the positions of the respective characteristic points (the cornea reflection images d and e, and end portions a and b of the iris) projected on a part of the image sensor. In this case, the equation (1) can be rewritten as follows:

$$\beta(A1\times L_{OC})\times\sin\theta\simeq(Xa'+Xb')/2-(Xd'+Xe')/2 \quad (2)$$

where the θ is a magnification determined by the position of the eyeball with respect to the light receiving lens 12. Essentially, this magnification is obtainable as the coefficient of the interval |Xd'−Xe'| of the cornea reflection images. The rotation angle θ of the eyeball can be rewritten as follows:

$$\theta\simeq\text{ARCSIN}\{(Xc'-Xf')/\beta/(A1\times L_{OC})\} \quad (3)$$

where $$Xc'\simeq(Xa'+Xb')/2$$

$$Xf'\simeq(Xd'+Xe')/2$$

Now, since the optical axis $ax_2$ of the photographer's eyeball does not agree with the visual axis, the angular correction δ is made between the optical axis and visual axis when the rotation angle θ of the optical axis $ax_2$ of the photographer's eyeball in the horizontal direction is calculated, thus making it possible to obtain the photographer's visual axis θH in the horizontal direction. Given the coefficient with which to consider the individual difference in the corrected angle δ between the optical axis $ax_2$ and the visual axis as B1, the photographer's visual axis θH in the horizontal direction can be obtained as follows:

$$\theta H=\theta\pm(B1\times\delta)$$

Here, assuming that the rotation angle to the right is positive in relation to the position of the photographer, the sign + of the ± is selected if the photographer uses his left eye in looking in the observation equipment, and the sign − is selected if he uses his right eye for the purpose.

Also, in FIG. 23B, an example is shown, in which the photographer's eyeball is rotated in the Z-X plane (horizontal plane, for example), but the detection is equally possible for the photographer's eyeball which rotates in Z-plane (vertical plane, for example). However, since the component of the photographer's visual axis in the vertical direction agrees with the component θ' of the eyeball in the vertical direction, the visual axis θV is:

$$\theta V=\theta'$$

Further, the positions (Xn, Yn) on the imaging plate in the finder field which the photographer looks in can be obtained by the visual axis data θH and θv as follows:

$$\begin{aligned} Xn &\simeq m\times\theta H \\ &\simeq m\times[\text{ARCSIN}\{(Xc'-Xf')/\beta/(A1\times L)\}\pm(B1\times\delta)] \\ Yn &\simeq m\times\theta V \end{aligned} \quad (5)$$

where the m is a constant determined by the finder optical system of a camera.

Here, the values of the coefficients A1 and B1 with which to correct the individual difference in the photographer's eyeball can be obtained when the photographer is requested to gaze at the indications which are arranged at given positions in the finder of a camera, and then, the positions of the indications are allowed to match the positions of the gazing points calculated by the equation (5).

In the present embodiment, the operation to obtain the photographer's visual axis and target points is executed in accordance with each of the foregoing equations by the application of the software with the microcomputer of the visual axis arithmetic processing unit.

Also, the coefficients with which to correct the individual difference in the visual axis usually correspond to the rotation of the observer's eyeball in the horizontal direction. Therefore, the two indications which are arranged in the finder of a camera are set in the horizontal direction with respect to the position of the observer.

When the coefficients for the correction of the individual difference in the visual axis are obtained, the equation (5) is used to calculate the position of the visual axis on the imaging plate of the photographer who looks in the finder of a camera. The visual axis information thus obtained is utilized for the focus adjustment of a photographing lens, exposure control, or the like.

Now, such a visual axis detection apparatus is installed in an optical apparatus like a camera or a telescope which is used both indoors and outdoors, there is a case where the observer's eyeball is illuminated by the external light (the sunlight) or it is not illuminated by such a light at all. Thus, the brightness of the eyeball image changes significantly. The dynamic range of an image sensor currently in use is considerably narrower than the ratio between the indoor and outdoor brightness for detecting the eyeball image. Hence, there is a need for the installation of the so-called auto-gain control (AGC) which enables the driving conditions of the image sensor to vary depending on brightness. In this respect, a proposal has been made to detecting the brightness of the eyeball portion by a sensor arranged in the vicinity of a finder in a patent application, Ser. No. 815,045 (filed on Dec. 31, 1991 in USA), but in an outdoor use, for example, the sunlight illuminates the eyeball locally or when the observer uses his spectacles, the source light from the sunlight or a lamp is reflected by the spectacles to illuminate the eye portion like a dot. Due to such an illumination, the brightness of the eyeball portion cannot be detected exactly. In such a case, the eyeball portion tends to be determined to be brighter than it actually is. As a result, the auto-gain controller makes the output of the image signals smaller. Then, the problem is encountered that it becomes impossible to detect the characteristic points of the eyeball image which are described in conjunction with the foregoing principle of the visual axis detection, particularly the end portions of the iris. As a result, the visual axis detection cannot be executed eventually. Also, in use in the shade or the like on the contrary, there often exist a portion which is slightly brighter due to light from the surroundings locally, and a portion which is extremely dark such as the shade of the pupil, the corners of the eye. Thus, contrary to the example mentioned above, the output of the image signals tends to be increased more than necessary. In this case, the noise of the external light is often amplified, resulting in the problem that the cornea reflection images are erroneously detected.

SUMMARY OF THE INVENTION

It is an object of the present invention to improve the visual axis detection apparatus such as disclosed in the U.S. patent application Ser. No. 815,045 and to provide a visual axis detection apparatus which is particularly capable of exactly detecting the brightness of the eyeball so that the stabilized detection of an observer's visual axis can be executed.

It is another object of the present invention to provide a new accumulation control of an image sensor as well as to implement the shorter period of measuring time when the luminance of an observer's eye is measured, hence making it particularly possible to detect the visual axis stably irrespective of the environmental conditions which surround the observer.

With the objectives such as above, only when a transfer driving is executed in an area which requires an amount of signals, the transfer speed is retarded in the present embodiment so that the charge accumulation for the photoelectric conversion is executed in the pixel positions, and at the same time, the amount of the signal processing after the read-out is curtailed by increasing the cumulative output of the accumulated charge at each of the pixel positions in transfer.

Also, for a visual axis detection apparatus comprising means to illuminate an observer's eyeball, light receiving means to detect the reflection image of the eyeball, and finder means arranged for the observer to observe the finder field, in which the observer's visual axis direction is detected by utilizing the reflected image of the eyeball, there will be set forth below another embodiment in which before the visual axis is detected, the detection area of the reflected image of the eyeball is divided into a plurality of areas in order to detect the luminance information of the reflected image.

BRIEF DESCRIPTION OF THE DRAWINGS

FIG. 4 is an electric circuit diagram of a camera according to an embodiment of the present invention.

FIG. 17 is a view showing an AGC table stored in the CPU shown in FIG. 4.

DETAILED DESCRIPTION OF THE PREFERRED EMBODIMENTS

Figure 1:
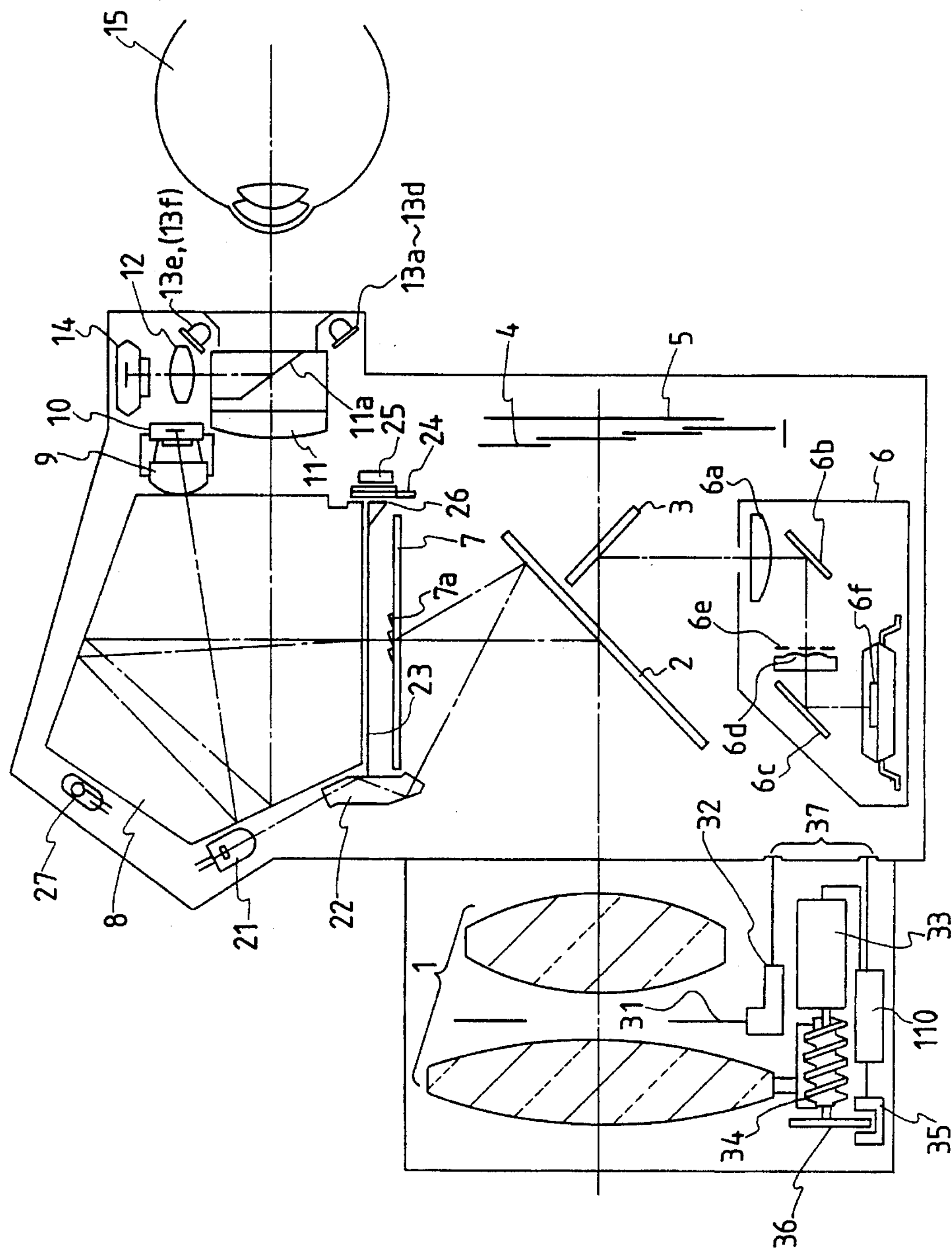
FIG. 1 is a view schematically showing the principal part of an embodiment in which the present invention is applied to a single-lens reflex camera.
Figure 2:
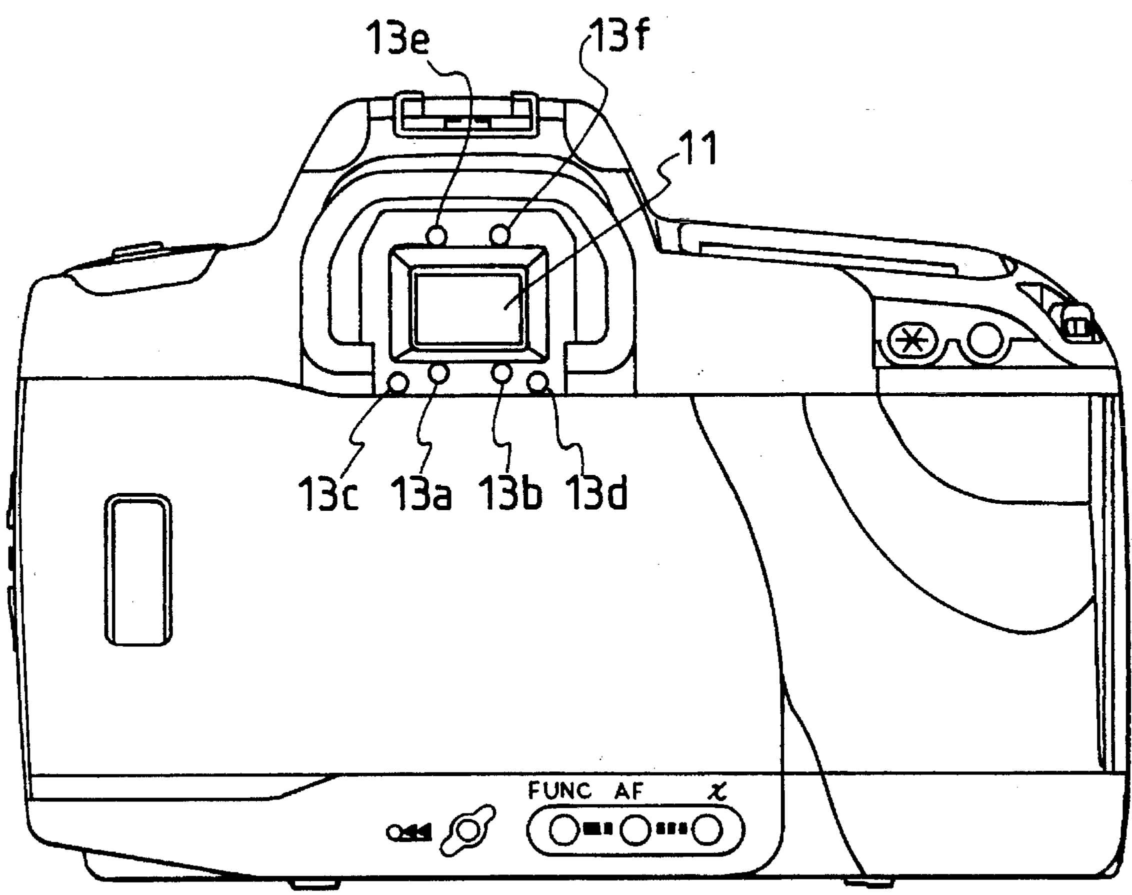
FIG. 2 is a rear view schematically showing a single-lens reflex camera to which the present invention is applied.
Figure 3:
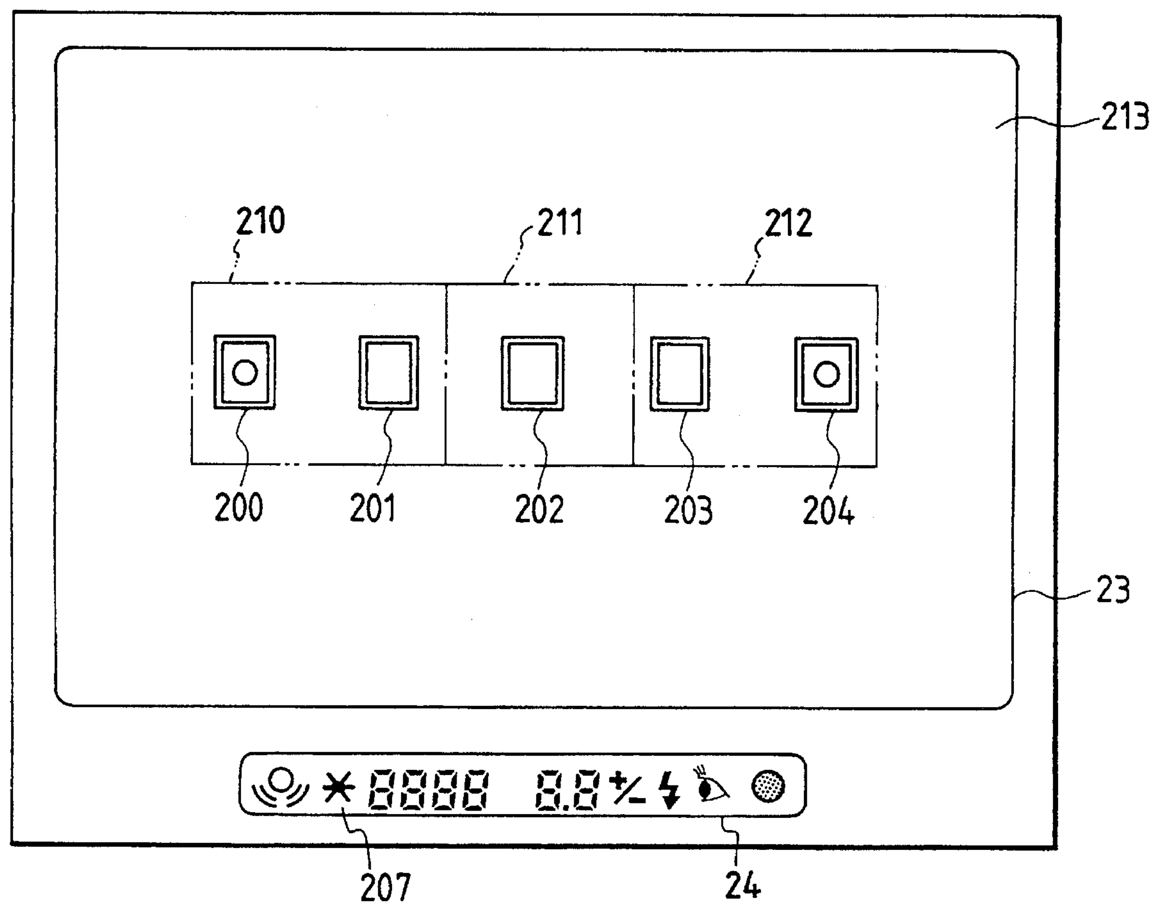
FIG. 3 is a view illustrating the interior of the finder field shown in FIG. 1.

FIG. 1 is a view schematically showing the principal part of an embodiment of a single-lens reflex camera to which the present invention is applied. FIG. 2 is a rear view schematically showing a single-lens reflex camera to which the present invention is applied. FIG. 3 is a view illustrating the finder view shown in FIG. 1.

In FIGS. 1 to 3, a reference numeral 1 designates a photographing lens which is represented by two lenses for the convenience. Actually, however, this lens comprises many more lenses. Numeral 2 designates a main mirror which is installed to be inclinable to or retractable from the photographing light path depending on the observation state of an objective image and the photographing state thereof; 3, a sub-mirror which reflects the luminous flux transmitting through the main mirror 2 to a focal point detection apparatus 6 which is arranged in the lower part of the camera body; 4, a shutter; 5, a photosensitive member comprising a silver salt film or a solid state photographing element such as CCD or MOS type or a vidicon or other imaging tubes; 6, a focal point detection apparatus comprising a field lens 6_a_ arranged in the vicinity of the image formation plane, reflection mirrors 6_b_ and 6_c_, a secondary image formation lens 6_d_, diaphragm 6_e_, a line sensor formed by a plurality of CCDs, and others.

In the present embodiment, the focal point detection apparatus 6 uses the well known phase differential method, and as shown in FIG. 3, the apparatus is structured to define the plural areas (five locations) in the observing plane (in the finder view) as distance measuring points, and to make these distance measuring points detectable as focal points. Numeral 7 designates a focusing plate arranged on the anticipated image formation plane of the photographing lens 1; 8, a pentagonal prism for changing the finder light paths; and 9 and 10, a imaging lens and a photometric sensor, respectively, for measuring the luminance of an object in the observing screen. The imaging lens 9 enables the imaging plate 7 and photometric sensor 10 to be conjugately related through the reflection light path in the pentagonal prism 8.

Now, behind the exit plane of the pentagonal prism 8, an eye piece 11 is arranged with a light splitter **11*a* for use of the observation of the imaging plate 7 by the photographer's eye 15. The light splitter 11*a*** is formed by a dichroic mirror which transmits a visible light but reflects the infrared light, for example.

Numeral 12 designates a light receiving lens; 14, an image sensor having two-dimensionally arranged photoelectric element array of CCDs or the like, which is conjugately arranged in the vicinity of the photographer's eye 15 located in a given position with respect to the light receiving lens 12; and **13*a* to 13*f*, the infrared light emitting diodes serving as each of the illuminating light sources, which are arranged around the eye piece 11 as shown in FIG. 2; 21, a superimposing LED of a high luminance visibly recognizable even in a bright object, the emitted light of which reaches the photographer's eye 15 through a projecting prism 22, reflected by the main mirror 2, bent in the vertical direction by the fine prism array 7*a* provided in the display unit of the focusing plate 7, and then, through the pentagonal prism 8 and the eye piece 11**.

Here, the fine prism array **7*a* is arranged in the form of a frame each in plural positions (distance measuring points) corresponding to the focal point detection areas in the imaging plate 7. These arrays are illuminated by five superimpose LEDs 21** (designated as LED-L1, LED-L2, LED-C, LED-R1, and LED-R2, respectively) which correspond to each of the frames.

In this way, as readily understandable from the finder field shown in FIG. 3, each of the distance measuring point marks 200, 201, 202, 203, and 204 becomes luminous in the finder field so that the focal point detection areas (distance measuring points) can be indicated (hereinafter, this is referred to as superpose indication).

Numeral 23 designates a field mask which forms the finder field area; and 24, a finder inner LCD for displaying the photographic information outside the finder field, which is illuminated by an illumination LED (F-LED) 25. The light which has passed the LCD 24 is guided into the finder field through a triangular prism 26, and displayed outside the finder field as shown at 207 in FIG. 3, thus enabling the photographer to teach the photographic information. Numeral 27 designates a know mercury switch for detecting the camera posture.

Numeral 31 designates a diaphragm arranged in the photographing lens 1; 32, a driving apparatus including the diaphragm driving circuit 111 which will be described later; 33, a lens driving motor; 34, a lens driving member 24 comprising a driving gear and others; and 35 is a photocoupler which detects the rotation of the pulsing plate 36 which is interlocked with the lens driving member, and transmits the detected result to a lens focal point adjustment circuit 110. The focal point adjustment circuit 110 causes the lens driving motor to be driven for a given amount in accordance with this information as well as the information regarding the lens driving amount from the camera side, thus shifting the photographing lens 1 to the in-focus position. Numeral 37 designates a known mount contact which serves as an interface between the camera and lens.

FIG. 4 is a block diagram illustrating the electric circuit incorporated in a camera according to the present invention, in which the same reference marks are provided for the elements which are the same as those shown in FIG. 1.

To the central processing unit (hereinafter referred to as CPU) 100 of a microcomputer incorporated in the camera main body, there are connected a visual axis detection circuit 101, a photometric circuit 102, an automatic focal point detection circuit 103, a signal input circuit 104, an LCD driving circuit 105, and LED driving circuit 106, an IRED driving circuit 107, a shutter control circuit 108, and a motor control circuit 109. Also, through the mount contact 37 shown in FIG. 1, the focal point adjustment circuit 110 arranged in the photographing lens 1 and the diaphragm driving circuit 111 execute the transmission of signals.

An EEPROM **100*a* attached to the CPU 100** has a storage function as storing means to store visual axis correction data with which to correct the individual difference in the visual axis.

The visual axis detection circuit 101 amplifies the output of the eyeball image from an image sensor 14 (CCD-EYE), and transmits this image signal to the CPU 100. The CPU 100 converts the image signals into the digital value by use of an A/D converter incorporated in the CPU, and then, extracts each of the characteristic points of the eyeball image which are needed for the visual axis detection in accordance with a given algorithm. Further, the CPU calculates the visual axis of the photographer on the basis of the positions of the respective characteristic points. As regards this detection, the description is made in detail in the U.S. patent application Ser. No. 888,495 (filed on May 27, 1992).

After the amplification of the output from the photometric sensor 10, the photometric circuit 102 compresses it logarithmically and transfers it to the CPU 100 as the luminance information of each sensor subsequent to its A/D conversion. The photometric sensor 10 comprises the photodiodes which photometrically measure four areas, that is, the SPC-L which photometrically measures the left-hand area 210 including the left-side distance measuring points 200 and 201 in the finder view as shown in FIG. 3; the SPC-C which photometrically measures the central area 211 including the distance measuring point 202 in the center; the SPC-R which photometrically measures the right-hand area 212 including the right-side distance measuring points 203 and 204; and the SPC-A which photometrically measures the circumference 213 of these areas.

The line sensor **6*f* shown in FIG. 4 is a known CCD line sensor comprising the five sets of line sensors CCD-L2, CCD-L1, CCD-C, CCD-R1, and CCD-R2 which correspond to the five distance measuring points 200 to 204 in the image screen as shown in FIG. 3**.

The automatic focal point detection circuit 103 A/D converts the voltage obtained from these line sensors **6*f* to transmit it to the CPU 100. A reference mark SW-1 designates a switch which is turned on by the first stroke of a release button to start the photometry, AF, visual axis detecting operation, and others; SW-2, a release switch which is turned on by the second stroke of the release button; SW-ANG, a posture detecting switch which is detected by the mercury switch 27; SW-AEL, an AE lock switch which is turned on by depressing an AE lock button; and SW-DIAL1 and SW-DIAL2, the dial switches provided in an electronic dial (not shown), the output of which is inputted into the up-down counter of the signal input circuit 104 to count the clicking amounts of the electronic dial; 105, the known LCD driving circuit which drives the liquid crystal indication element LCD to display the diaphragm value, shutter seconds, set photographing mode, and others both on the monitoring LCD 42 and the LCD 24 in the finder at the same time in accordance with signals from the CPU 100. The LED driving circuit 106 controls the illumination LED (F-LED) 25 and the superimpose LED 21 to illuminate or blink. The IRED driving circuit 107 selectively illuminates the infrared light emitting diodes (IRED1 to 6) 13***a* to 13*f* depending on the situations.

When charged, the shutter control circuit 108 controls the magnet MG-1 which enables the first blade to run, and the magnet MG-2 which enables the second blade to run, thus allowing the photosensitive member to be exposed in a given luminous energy. The motor control circuit 109 is to control a motor M-1 for the execution of film wind up and rewind, and also, controls a motor M-2 for operating the main mirror 2 and charging the shutter 4. By use of the shutter control circuit 108 and motor control circuit 109, a series of release sequence operations are executed for the camera.

Figure 5:
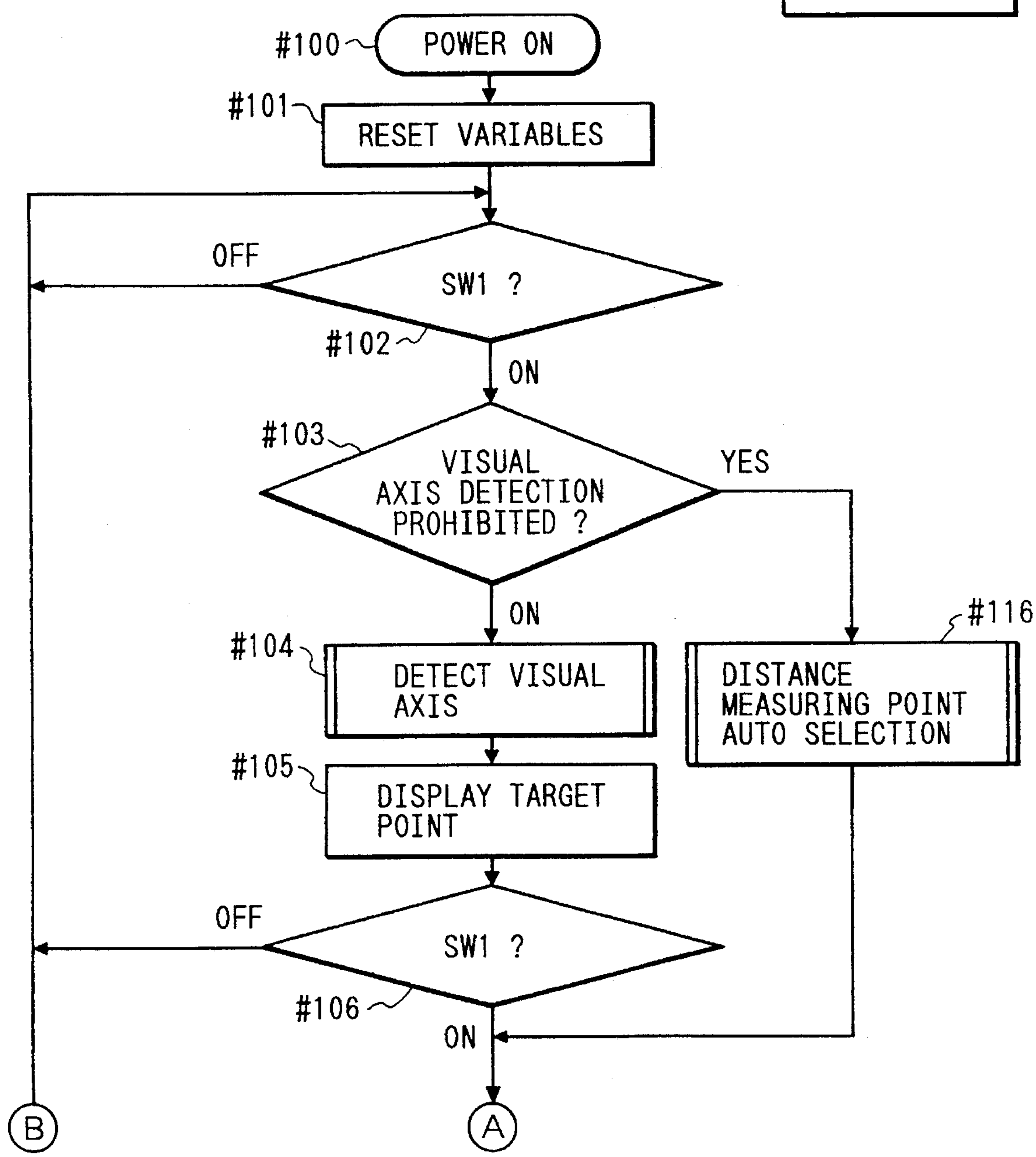
FIGS. 5 which consists of FIGS. 5A and 5B, is an operational flowchart of a camera having a visual axis detection apparatus according to an embodiment of the present invention.
Figure 5B:
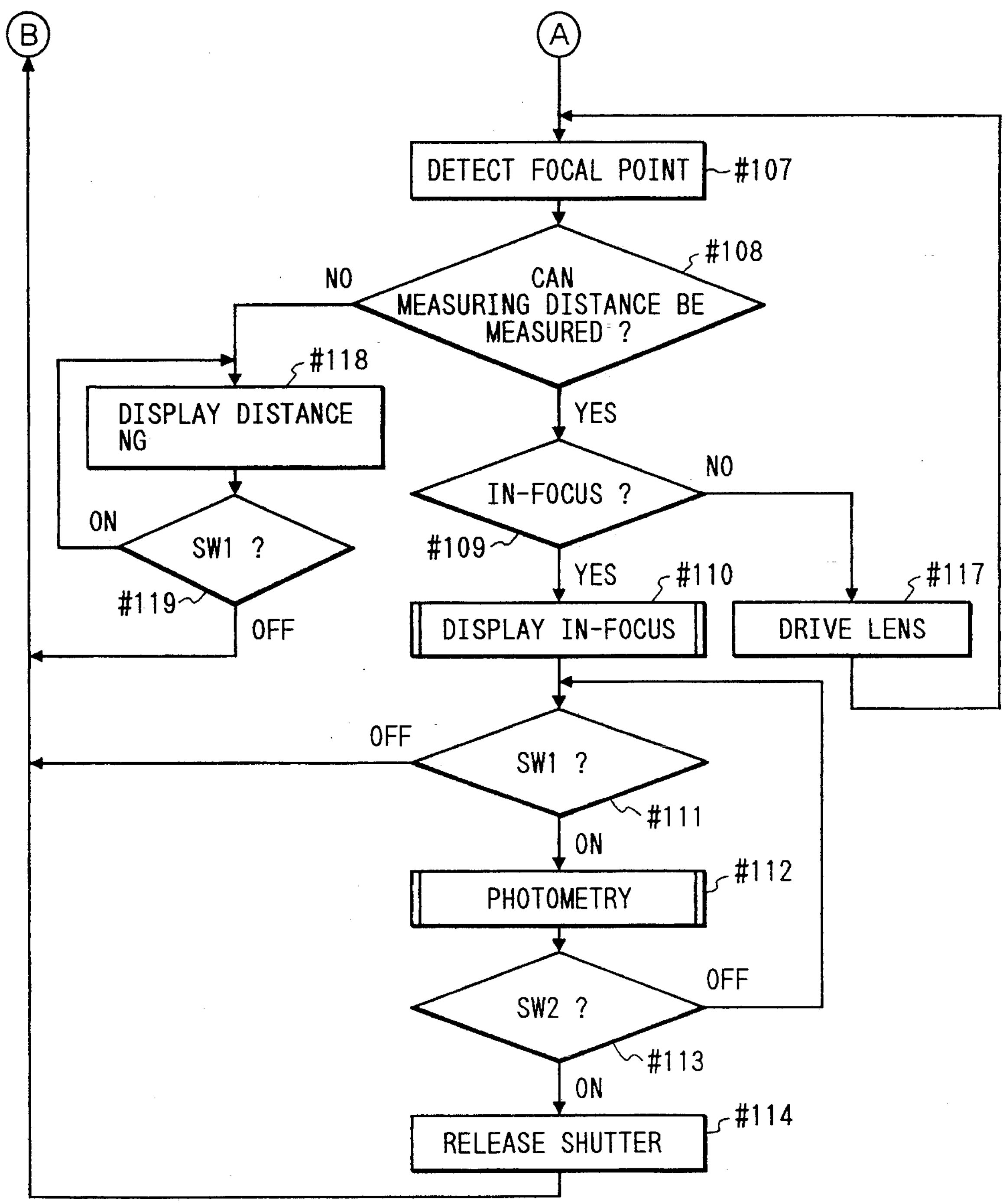

Now, an operational flowchart of the camera which has a visual axis detection apparatus is shown in FIGS. 5A and 5B, and the description will be made of the operation of such camera in accordance with the flowchart. When a mode dial (not shown) is turned to set the camera from the inactive state to a given photographing mode (in the present embodiment, the description will be made of the mode which has been set for the shutter preference AE), the power source of the camera is turned on (S100). The variables for the visual axis detection by the CPU 100 are reset (S101). Then, the camera will be on standby until the release button is depressed so that the switch SW1 is turned on (S102). When the signal input circuit 104 detects that the release button is depressed and the switch SW1 is turned on, the CPU 100 will confirm this by means of the visual axis detection circuit 101 (S103). At this juncture, if the mode is set in a visual axis prohibition, no visual axis detection will be executed. In other words, a specific distance measuring point is selected by the distance measuring selection subroutine without using any visual axis information (S106). At this distance measuring point, the automatic focal point detection circuit 103 executes a focal point detecting operation (S107).

In this respect, there are conceivably several algorithms for the automatic selection of the distance measuring points. It is effective to use a close point preference algorithm in which the central point Of a distance measuring region is weighted. Here, however, this algorithm is not directly concerned with the present invention. Therefore, the description thereof will be omitted.

Also, when the visual axis detection mode is set, the sight detection will be executed (S104). Here, the visual axis detected by the visual axis detection circuit 101 is transformed into the target point coordinates on the imaging plate 7. The CPU 100 selects the distance measuring points close to the forgoing target point coordinates, and transmits signals to the LED driving circuit 106, and then, blinks the foregoing distance measuring marks for display by use of the superimpose LED 21 (S105).

The photographer looks at the display of the distance measuring points which have been selected in accordance with the photographer's visual axis. Here, if the photographer does not recognize that the distance measuring points thus displayed are correct, and releases his finger from depressing the release button to turn off the switch SW1 (S106), the camera will be on standby until the switch SW1 is again turned on (S102). In this way, with the blinking display of the distance measuring points in the finder field, the photographer is informed of the selection of the distance measuring points by the visual axis information. Thus, the photographer can confirm whether the distance measuring points have been selected as intended or not.

Also, if the photographer continues turning on the switch SW1 (S106) while looking at the display of the distance measuring points thus selected by the photographer's visual axis, the automatic focus detection circuit 103 executes the focal point detection at one or more distance measuring points (S107) using the detected visual axis information. Here, it is determined whether or not the selected distance measuring point is measurable (S108). If not measurable, the CPU 100 transmits a signal to the LCD driving circuit 105 in order to blink the in-focus mark of the LCD 24 in the finder so that the photographer is warned of the NG (not good) of the distance measuring point (S118). This will continue until the SW1 is released (S119).

If the distance measurement is possible, the CPU 100 transmits a signal to the lens focal point adjustment circuit 110 to drive the photographing lens 1 for a given amount (S117) if the focal point adjustment of the distance measuring point selected by a predetermined algorithm is not in the in-focus state (S109). After the lens is driven, the automatic focal point detection circuit 103 executes the focal point detection again (S107) to examine whether or not the photographing lens 1 is in the in-focus state (S109).

If the photographing lens 1 is in the in-focus state at the given distance measuring point, the CPU 100 transmits a signal to the LCD driving circuit 105 in order to illuminate the in-focus mark of the LCD 24 in the finder, and at the same time, transmits a signal to the LED driving circuit 106 so that the in-focus indication is given to the focused distance measuring point 201 (S110).

At this juncture, the blinking indication of the distance measuring point selected by the forgoing visual axis is turned off. However, the distance measuring point in the in-focus indication often matches with the distance measuring point selected by the visual axis. Therefore, the focused distance point is set in the illuminated state for the purpose of enabling the photographer to confirm that the distance measuring point is in the in-focus state. The photographer looks at the focused distance measuring point thus indicated in the finder, but if he releases his finger from the release button to turn off the switch 1 (S111) considering that the focused distance measuring point is still incorrect, the camera will then be on standby continuously until the switch SW1 is turned on (S102). Also, when the photographer looks at the distance measuring point which is in the in-focus indication, and keeps the switch SW1 turning on (S111), the CPU 100 transmits a signal to the photometric circuit 102 for the execution of a photometry (S112). At this juncture, an exposure value of the weighted photometric areas 210 to 213 is calculated including the distance measuring point in-focus.

In the present embodiment, the known photometric operation is executed, in which the photometric area 210 including the photometric point 201 has been weighted.

Then, it is determined whether or not the release button 41 is further depressed to turn on the switch SW2 (S113). If the switch SW2 is still in the OFF-state, the current state of the switch SW1 will be again examined for confirmation (S111).

Here, if the switch SW2 is turned on, the CPU 100 transmits a signal to the shutter control circuit 108, motor control circuit 109, and diaphragm control circuit 111, respectively.

At first, the motor M2 is energized in order to raise the main mirror 2. Then, after the diaphragm 31 is stopped down, the magnet MG1 is charged to release the first blade of the shutter 4. The stop value of the diaphragm 31 and the shutter speed of the shutter 4 are determined by the exposure value detected by the photometric circuit 102 and the sensitivity of the film After the elapse of a given shutter seconds (1/250 second, for example), the magnet MG2 is charged to close the second blade of the shutter 4. When the exposure to the film 5 is completed, the motor M2 is again energized to lower the mirror, and charge the shutter, and at the same time, to energize the motor M1 for the frame feeding of the film. Thus, a series of the shutter release sequential operations are terminated (S114). The camera will be on standby until the switch SW1 is again turned on (S102).

Figure 6:
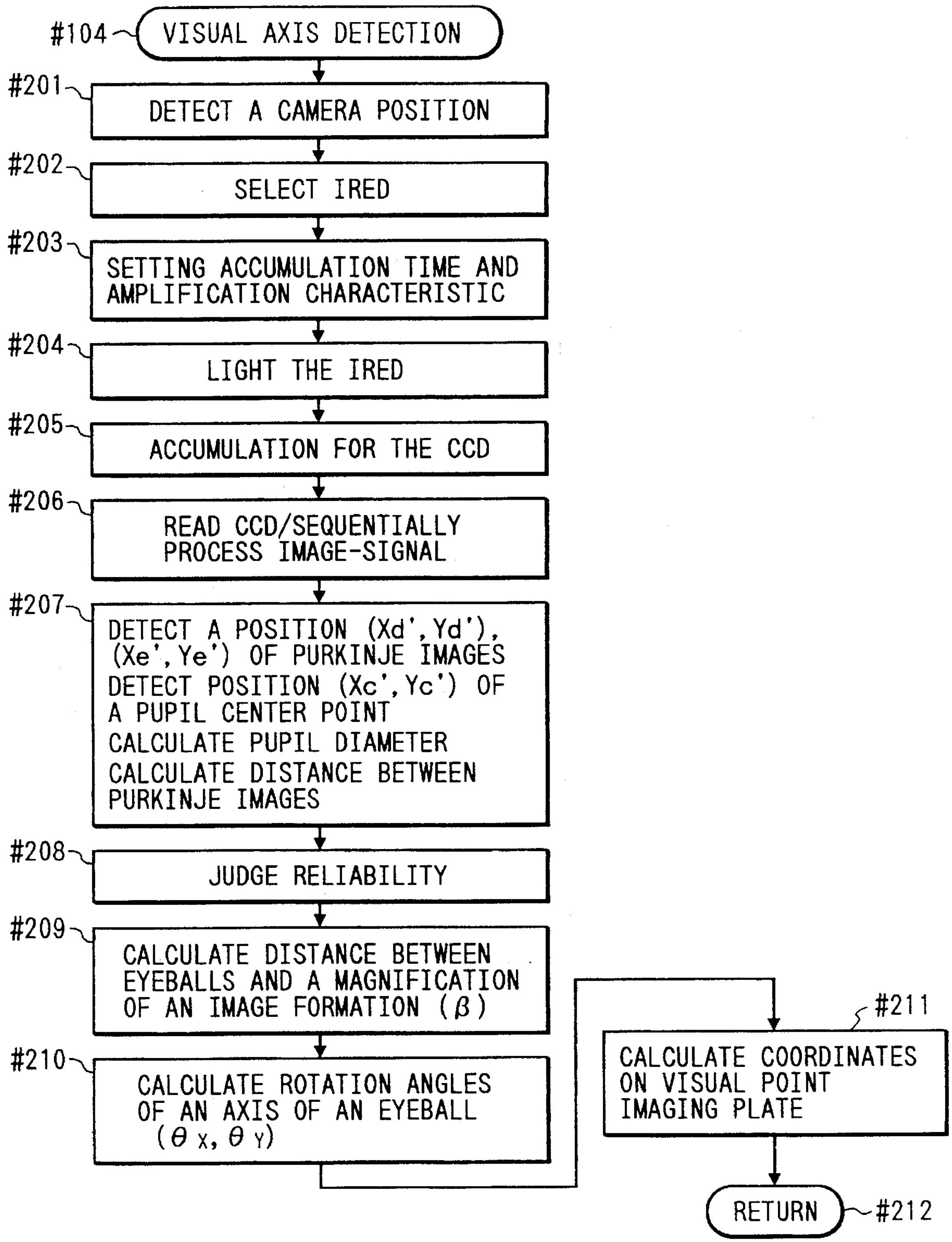
FIG. 6 is a flowchart showing a visual axis detection according to an embodiment of the present invention.

FIG. 6 is a flowchart showing a visual axis detection. As described above, receiving signals from the CPU 100, the visual axis detection circuit 101 executes a visual axis detection (S104). At first, the visual axis detection circuit 101 detects the posture of a camera through the signal input circuit 104 at first in executing of a visual axis detection in the photographing mode (S201). The signal input circuit 104 processes the signals output from the mercury switch 27 (SW-ANG) in order to determine whether the camera is in the horizontal position or in the vertical position, and whether the release button is in the sky direction or in the ground (surface) direction if the camera is in the vertical position.

Then, the infrared light emitting diodes (hereinafter referred to as IRED) 13*a* to 13*f* are selected in accordance with the information regarding the photographer's spectacles which is included in the camera posture information detected earlier and the calibration data (S202). In other words, if the camera is postured in the horizontal position and the photographer does not wear his spectacles, the IREDs 13*a* and 13*b* are selected from the finder optical axis as shown in FIG. 2. Also, if the camera is in the horizontal position and the photographer wares his spectacles, the IREDs 13*c* and 13*d* away form the finder optical axis are selected. At this juncture, a part of the illuminating light which is reflected by the photographer's spectacles reaches the area other than a given position on the image sensor 14 where the eyeball image is projected. Thus, there is no hindrance in analyzing the eyeball image.

Further, if the camera is postured in the vertical position, either a combination of the IREDs 13*a* and 13*e* or the IREDs 13*b* and 13*f*, which illuminate the photographer's eyeball from the below, is selected.

Now, based on the luminance information (brightness) of the eyeball, the accumulation time and amplification characteristics of the image sensor 14 (hereinafter referred to as CCD-EYE) are set (S203). In order to know the luminance information of the eyeball, the detected eye image is divided into a plurality of areas at first. Then, it is arranged to set the optimal time of accumulation and amplification characteristics so that the Purkinje images and the characteristic points of the pupil portion can be extracted easily by determining the illuminated condition of the eyeball due to the external light on the basis of each luminance value: whether or not any external light hits the eyeball, whether or not the interior condition of the room is dark, for example. For this setting method, the description will be made later in detail.

When the accumulation time for the CCD-EYE is set, the CPU 100 turns on the IRED by a given power through the IRED driving circuit 107 (S204). At the same time, the visual axis detection circuit 101 starts accumulating the CCD-EYE (S205).

In accordance with the previously set CCD-EYE accumulation time, the CCD-EYE completes the accumulation. The IRED is turned off simultaneously.

While reading out the eyeball image of the photographer from the CCD-EYE which has completed the accumulation, the CPU 100 processes the extraction of the characteristics of the cornea reflection images (hereinafter referred to as Purkinje images) and the pupil portion sequentially (S206). Since the Purkinje images appear as luminous points having a strong light intensity, a predetermined threshold value is established for the light intensity to make it possible to extract those which have exceed such threshold value as the Purkinje image candidates. Also, a plurality of boundary points are extracted between the pupil 19 and iris 17.

Now, after the completion of the extraction of the Purkinje images and pupil characteristics, the position of a pair of Purkinje images and the position of the pupil's center are detected on the basis of these pieces of information (S207). There are detected the positions (Xd', Yd'), (Xe', Ye') of the Purkinje images which are false images of a pair of IREDs on substantially one line of the CCD-EYE. The pupil's central positions (Xc', Yd') are detected by operating the least square approximation of a circle on the basis of each of the extracted boundary points. At this juncture, the pupil's diameter $r_p$ is calculated. Also, the interval between the two Purkinje images is calculated by the positions thereof (S207). Further, the reliability of the calculated positions of the Purkinje images and pupil's center are examined (S208).

Then, by the interval between the Purkinje images, the distance between the eye piece 11 and the photographer's eyeball 15 is calculated. Further, by the distance between the eye piece 11 and the photographer's eyeball 15, the imaging magnification β of the eyeball image projected on the CCD-EYE is calculated (S200). From the above-mentioned calculated values, the rotation angle 8 of the optical axis of the eyeball 15 is calculated by the equation (3) (S210). When the rotation angles $\theta_X$ and $\theta_Y$ of the photographer's eyeball are obtained, the position of the visual axis can be obtained by the equation (5) (S211). Then, the process will return from the visual axis routine (S212). Now, the description will be made of a method for dividing the detection area of the CCD-EYE 14 into a plurality of areas, and obtaining the luminance information of each of the areas thus divided.

In the visual axis detection circuit 101, a sensor driving apparatus SDR (not shown) is incorporated. When the sensor is driven, the timing signals ϕVI and ϕHI are supplied from the CPU 100. On the basis of these two timing signals, the sensor driving signals ϕVO and ϕHO are output to drive the image sensor CCD-EYE 14.

Figure 7:
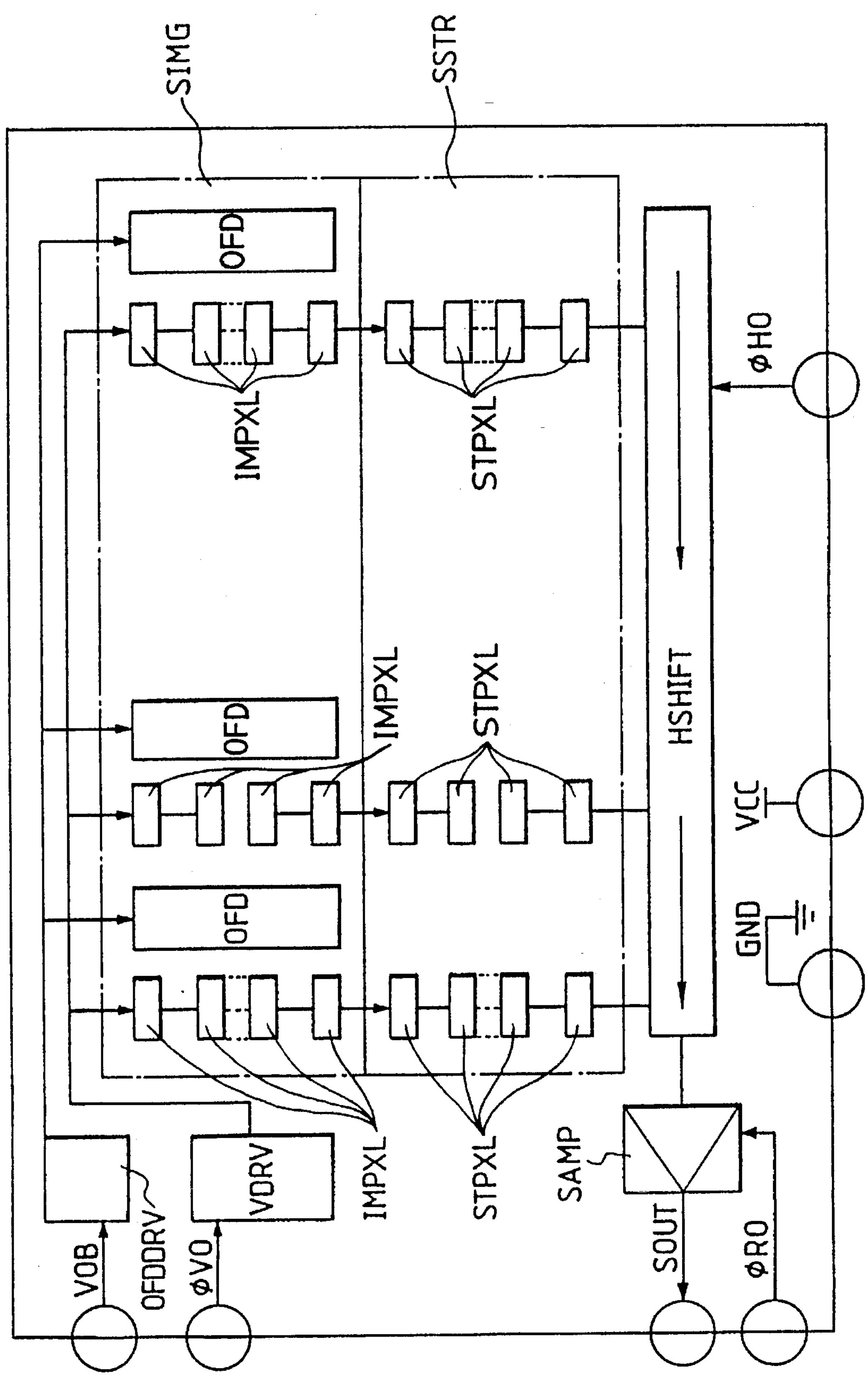
FIG. 7 is a block diagram of an image sensor CCD-EYE according to an embodiment of the present invention.

Now, in conjunction with FIG. 7, the image sensor CCD-EYE 14 will be described. FIG. 7 is a block diagram showing a CCD area sensor of a vertical frame transfer type comprising vertical pixels K and horizontal pixels L. The inner structure of the CCD sensor and the mechanism of the charge transfer are not directly concerned here. Therefore, the descriptions thereof will be omitted.

A reference mark SIMG designates a photosensitive area comprising the pixels IMPXL which are arranged in the vertical direction K and horizontal direction L. The IMPXL is a unit pixel which is provided with the photoelectric conversion function and charge transfer function like a photodiode, for example. When the vertical transfer clock ϕVO is applied, the signals generated here are driven by a plurality of driving signals generated in the CCD-EYE 14 on the basis of the ϕVO.

A reference mark SSTR designates a storage area which temporarily stores the charge generated in the photosensitive area SIMG. The unit storage STPXL constituting the SSTR has the same number as the unit pixel IMPXL constituting the SIMG. Likewise, its transfer clock is the vertical transfer clock ϕVO.

A reference mark HSHIFT designates the transfer registers in the horizontal direction. With the application of the horizontal transfer clock ϕHO which is inputted from the sensor driving apparatus SDR, the registers are driven by a plurality of driving signals generated in the CCD-EYE 14 on the basis of the ϕHO thus applied.

A reference mark ϕRO is a signal to initialize the output of a signal amplifying circuit SAMP in an interval between each of the pixel outputs in order of outputs from SOUT so that the output of the preceding pixel does not affect the next output pixel when the signals are transferred by the HSHIT and in synchronism with them, the signals are output from the SOUT.

To the VOF, a voltage is applied to control the saturated level of the pixel IMPXL. A reference mark OFD designates exhaust glooves, generally called overflow drains, which are provided for exhausting the charge higher than a given level in order to prevent the charge, which is generated in response to the luminous energy irradiated onto the pixel IMPXL, from becoming excessively saturated when this charge reaches a given level controlled by the voltage applied to the VOF.

Now, in conjunction with FIG. 8 to FIG. 14, the description will be made of a method for obtaining the luminance information of the eyeball in order to set the accumulation time for the image sensor CCD-EYE 14 shown in the step 203 in FIG. 6. Here, the pixels of K ×L numbers which are two-dimensionally arranged for the image sensor CCD-EYE 14 are divided into three equal divisions in the vertical direction and four equal divisions in the horizontal direction as show in FIG. 8. In other words, the luminance information is obtained from each of the two-dimensional areas which have been divided into the twelve equal divisions. In this case, the area equally divided by twelve comprises the pixels of (K/3)×(L/4) numbers.

Figure 8:
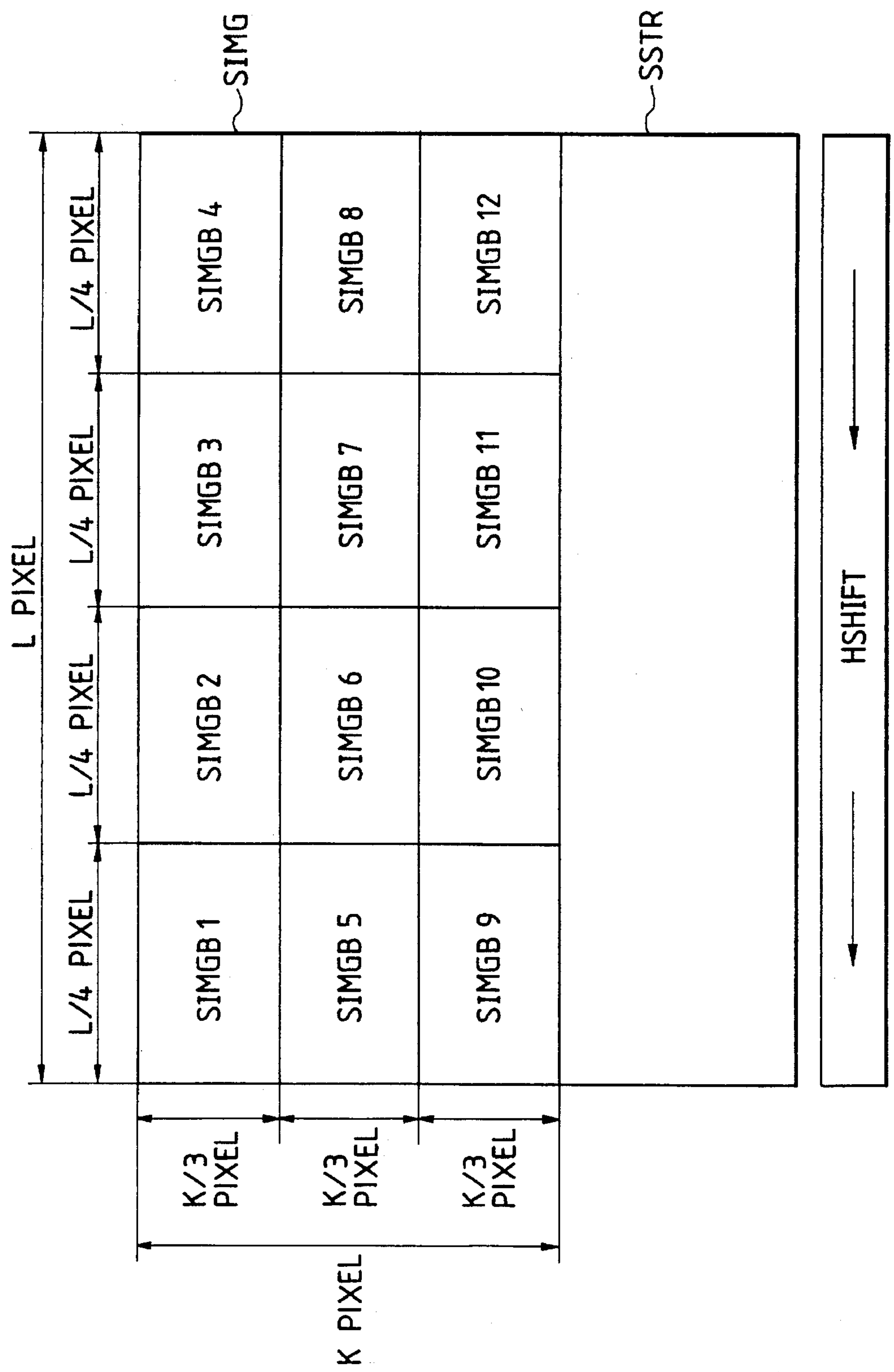
FIG. 8 is a view illustrating the divided areas of the image sensor CCD-EYE according to an embodiment of the present invention.
Figure 9:
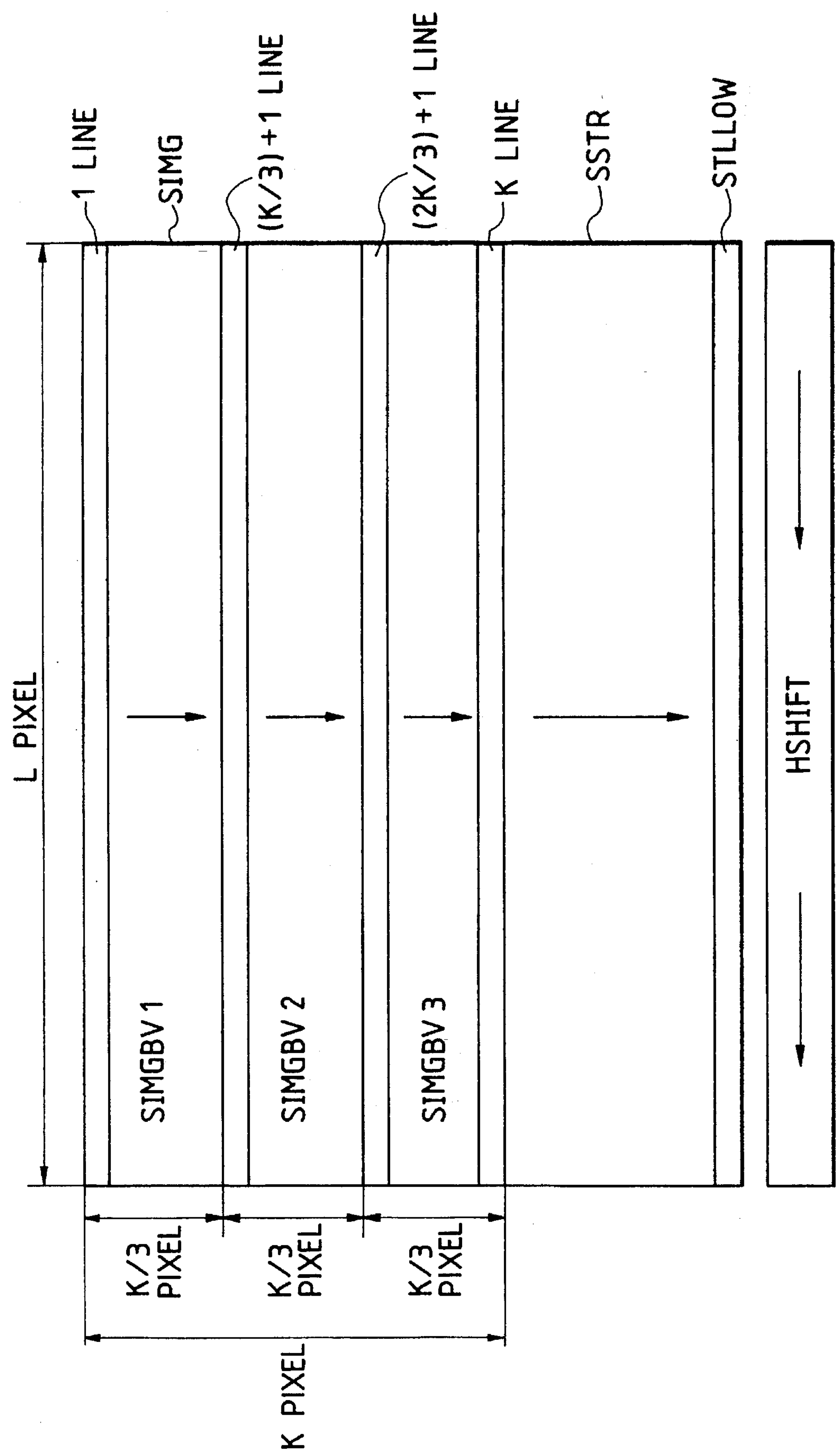
FIG. 9 is a view illustrating the area of the image sensor CCD-EYE in the horizontal direction according to an embodiment of the present invention.

FIG. 9 shows the components in the horizontal direction extracted from the twelve areas shown in FIG. 8. In FIG. 9, reference marks SIMGBV1, SIMGBV2, and SIMGBV3 designate the areas which are the three equal vertical divisions of the photosensitive area SIMG. The attention should be given to the line on the uppermost position in each of these areas, that is, the first line in the SIMGBV1, the (K/3) + first line in the SIMGBV2, and (2K/3) + first line in the SIMGBV3.

Figure 11:
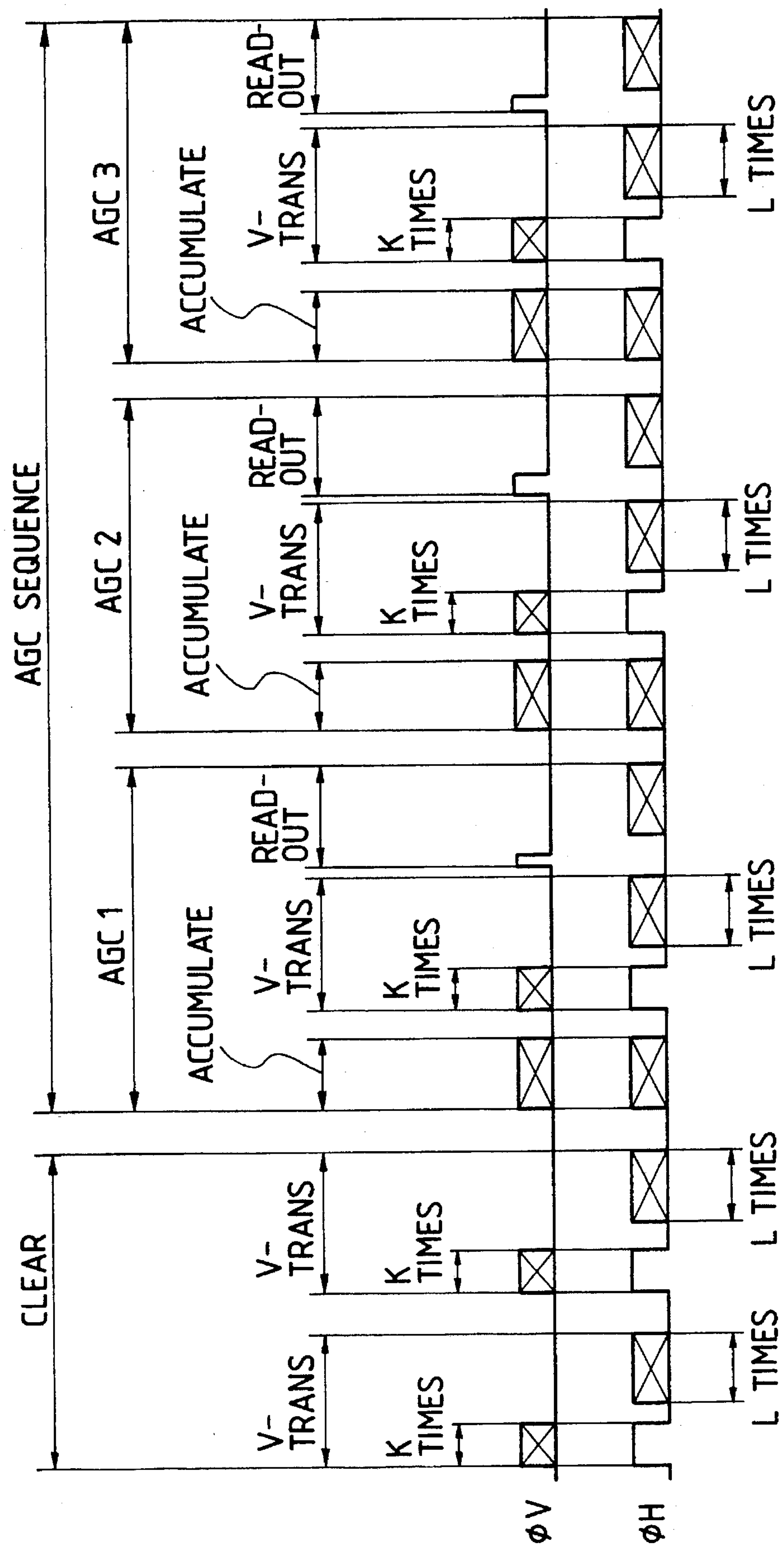
FIG. 11 is a view illustrating the driving timing of the image sensor CCD-EYE according to an embodiment of the present invention.

Hereinafter, the drive timing will be described. At first, a clearing drive is executed to exhaust the unwanted charge. FIG. 11 is a timing chart in which a clearing drive is executed for initialization by conducting the V-TRANS (vertical transfer) two cycles, which is a set repeating the ϕVO pulse for K times and the ϕHO pulse for L times to drive the SIMG and SSTR. The V-TRANS will be described later.

Now, an AGC sequence is executed. The AGC sequence shown in FIG. 11 is formed by the three subsequences AGC1, AGC2, and AGC3. Further, each of the sub-sequences is formed by each driving of the accumulation, V-TRANS, and read-out. Of these, the V-TRANS is the same drive as the V-TRANS at the time of clearing operation. At first, the sub-sequence AGC1 will be described.

Figure 12:
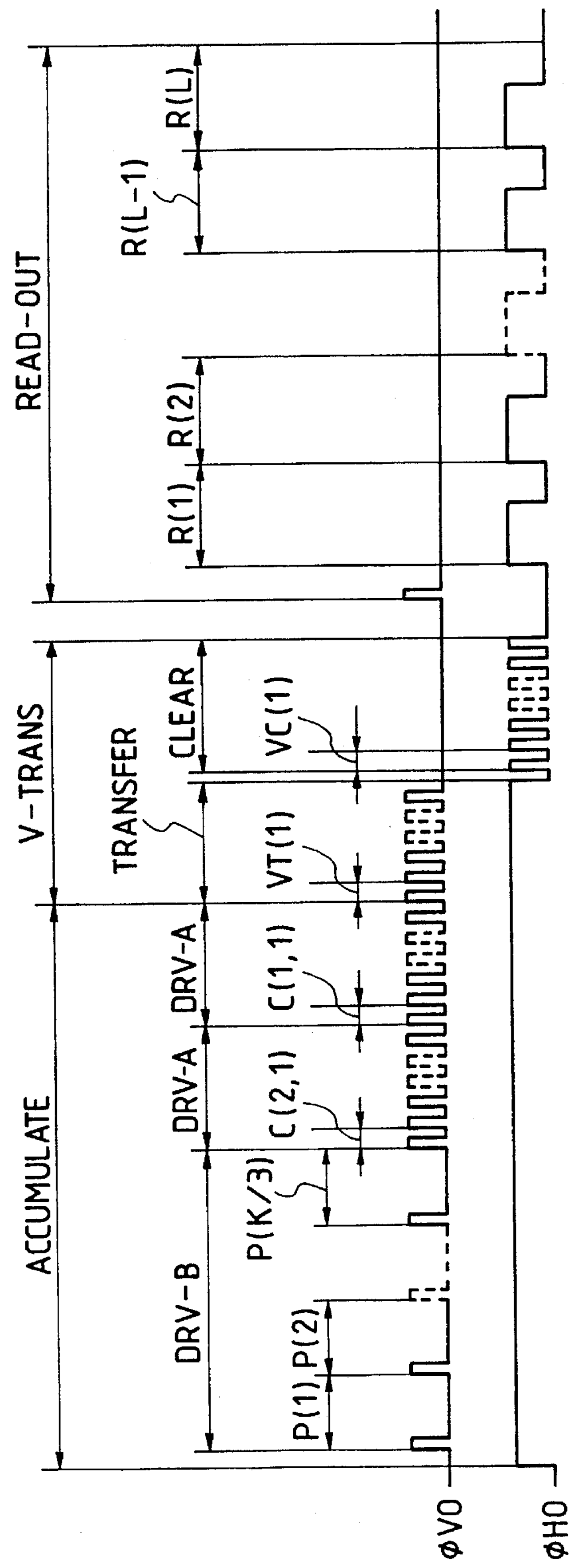
FIG. 12 is a view illustrating the driving timing of the image sensor CCD-EYE according to an embodiment of the present invention.

The AGC1 is a drive timing for the accumulation and read-out operations executed in the area of the SIMGV1 shown in FIG. 9. FIG. 12 is a timing chart which shows this in detail. In FIG. 12, the driving is executed by the two pulse driving patterns DRV-B and DRV-A. The marks P(1), C(2, 1), and C(1, 1) in the DRV-A and DRV-B correspond to the one-time transfer driving, respectively. In this way, the charge transfer is executed to the one adjacent pixel.

At first, making a relation of ϕHO=HI, the overflow drains arranged along the horizontal transfer registers HSGIFT (not shown) is switched on to make it possible to exhaust the excessive charge which has been transferred to the HSHIFT by the vertical transfer clock ϕVO.

Then, the transfer is executed in the vertical direction by the ϕVO. At first, during the DRV-B, the driving is executed by the ϕVO from the P(1) to P(K/3) which are at the same intervals. Here, during the P(1), the charge for the first line in FIG. 9 stays at the first line. Further, by the second ϕVO output, this charge is transferred to the second line. During the P(2), it stays at the second line until the third ϕVO output is provided. This is repeated for K/3 times to transfer the charge to the K/3rd line positioned in the lower column of the SIMGV1.

Here, each of the intervals from the P(1) to the P(K/3) is the transfer interval in the area SIMGB1 in the vertical direction. This becomes the accumulation time for accumulating the charge generated in each of the pixels which has remained in transfer. In other words, in the areas from the first line to the K/3rd line, the accumulation is executed for each of the pixels in the vertical direction by the time P(1), which will become identical to the total sum of these accumulated charges in the vertical direction. Hence, in the DRV-B mode, the total sum of the charges provided by scanning the areas from the first line to the K/3rd line, that is, the SIMGBV1, is accumulated on the K/3rd line. In continuation, the driving operation DRV-A will be executed. In the first DRV-A, the charge transferred to the K/3rd line in the DRV-B is transferred to the 2K/3rd line, and then, to the Kth line in the second DRV-A.

Here, In FIG. 12, each time represented by the mark C(2, 1) and C(1, 1) is the same, respectively, and both in the first and second DRV-A, the ϕVO is repeatedly output at the intervals C(2, 1) and C(1, 1). Even at this interval, the generation of the charge occurs in response to the irradiated luminous energy. However, the time at this interval is considerably short as compared to the time indicated from the P(1) to P(K/3). Accordingly, the amount of the generated charge is extremely small so that there will be almost no effect to be produced on the amount of the generated charged in the DRV-B. In this way, the charge up to the K/3rd line is transferred to the Kth line as it is.

Now, the mode in the V-TRANS will be described. The V-TRANS transfers the charge accumulated at the Kth line to the STLLOW which is the bottom line in the SSTR by outputting the control pulse by the ϕVO for K times. Further, by the ϕHO output for L times, the HSHIFT in which the charges immediately before the charge transfer at the first line are added and transferred is driven to execute the clearing operation. Then, the charge transferred to the STLLOW by the V-TRANS is read by the read-out operation. At first, by the first one pulse of the ϕVO thus read out, the charge transfer is executed from the STLLOW to the horizontal transfer registers. Subsequently, the first pixel is read at the R(1) in FIG. 12 which outputs the ϕHO pulse; and the second pixel, at the R(2); and then, Lth pixel, at the R(L).

At this juncture, the charge which is horizontally transferred by the ϕHO pulse array is sequentially provided with the voltage transformation and amplification by the signal amplifier SAMP in synchronism with the horizontal transfer, and further, converted from the analogue value to the digital value by the A/D converter incorporated in the CPU 100. Here, since the L number of pixels are present in the horizontal direction, the CPU 100 reads in the L number of the digital values which correspond to the R(1) to R(L) shown in FIG. 12.

Figure 10:
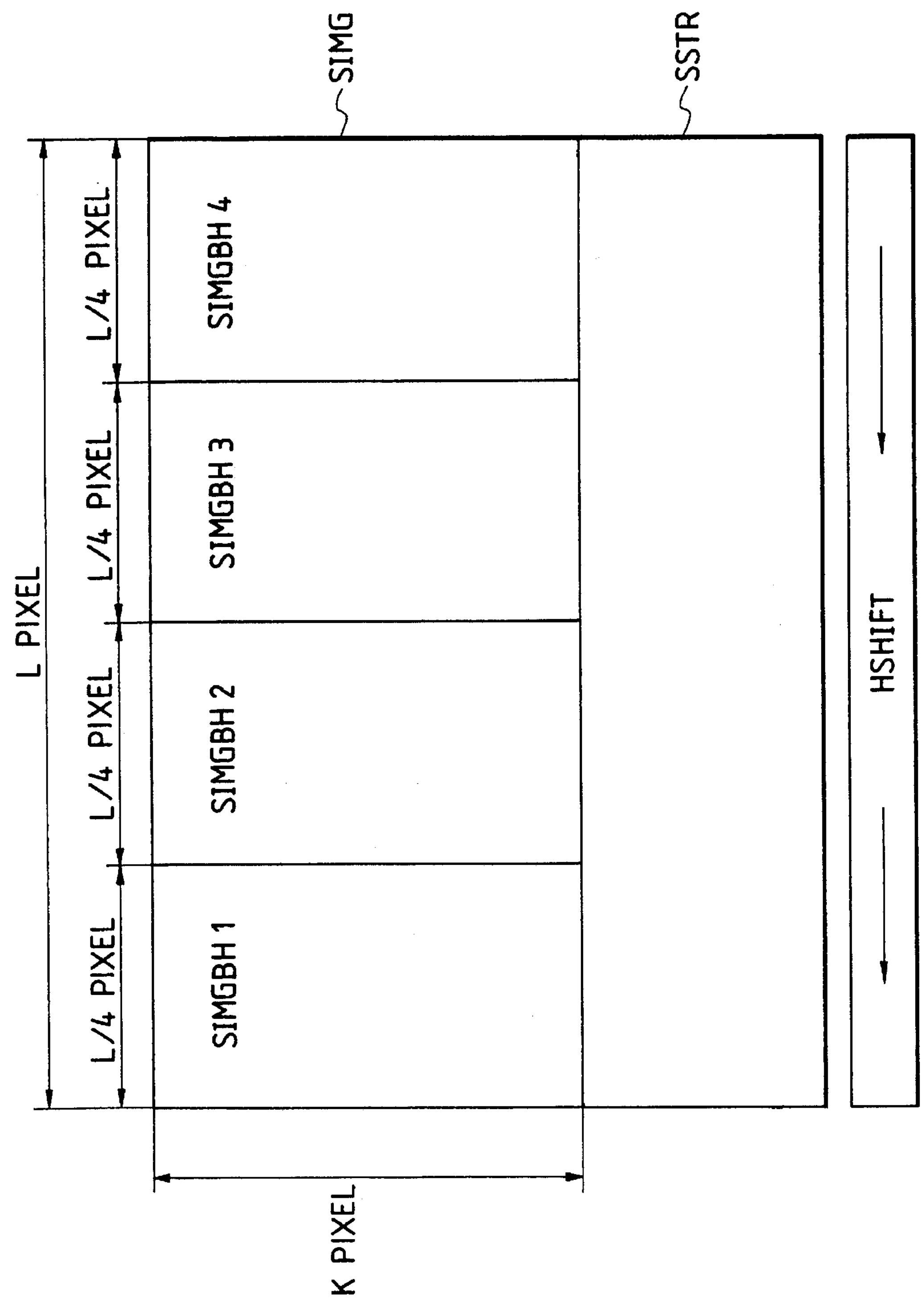
FIG. 10 is a view illustrating the area of the image sensor CCD-EYE in the vertical direction according to an embodiment of the present invention.

Given the digital value corresponding to the R(1) stored in the CPU 100 as D(1), and the digital value corresponding to the R(2) as D(2), and then, the digital value corresponding to the R(L) as D(L), the digital value corresponding to each of the areas SIMGBH1, SIMGBH2, SIMGBH3, AND SIMGBH4 shown in FIG. 10 becomes as follows:

SIMGBH1: D(1) to D(L/4)

SIMGBH2: D((L/4)+1) to D(2L/4)

SIMGBH3: D((2L/4)+1) to D(3L/4)

SIMGBH4: D((3L/4)+1) to D(L)

and as the luminance information, the following result of the operation will be obtained:

$$SIMGBH1 = \left( \sum_{i=1}^{L/4} (i) \right) / (L/4)$$

$$SIMGBH2 = \left( \sum_{i=(L/4)+1}^{2L/4} (i) \right) / (L/4)$$

$$SIMGBH3 = \left( \sum_{i=(2L/4)+1}^{3L/4} (i) \right) / (L/4)$$

$$SIMGBH4 = \left( \sum_{i=(3L/4)+1}^{4L/4} (i) \right) / (L/4)$$

In this case, the value SIMGBH1 is the average value per pixel of the charge which has been photoelectrically converted by the luminance irradiated in the areas indicated by the SIMGB1 in FIG. 8. By operating this per area, the value thus obtained is utilized as the luminance information of each area.

Figure 13:
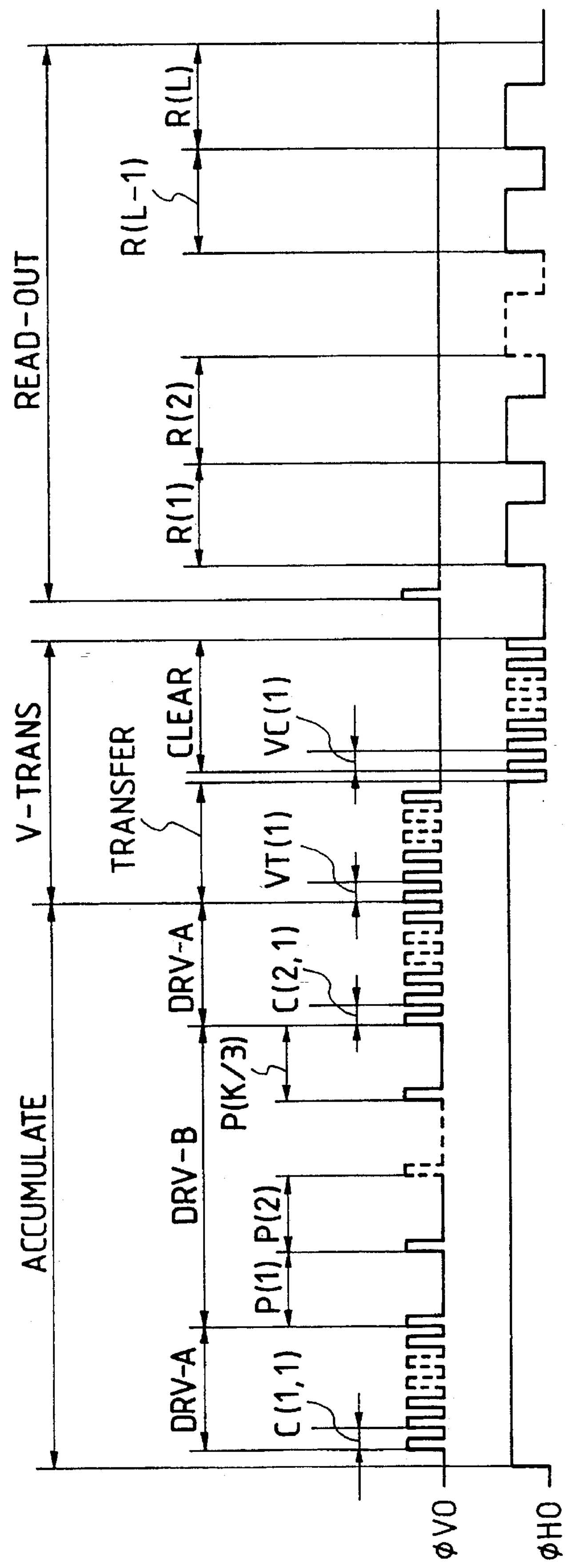
FIG. 13 is a view illustrating the driving timing of the image sensor CCD-EYE according to an embodiment of the present invention.
Figure 14:
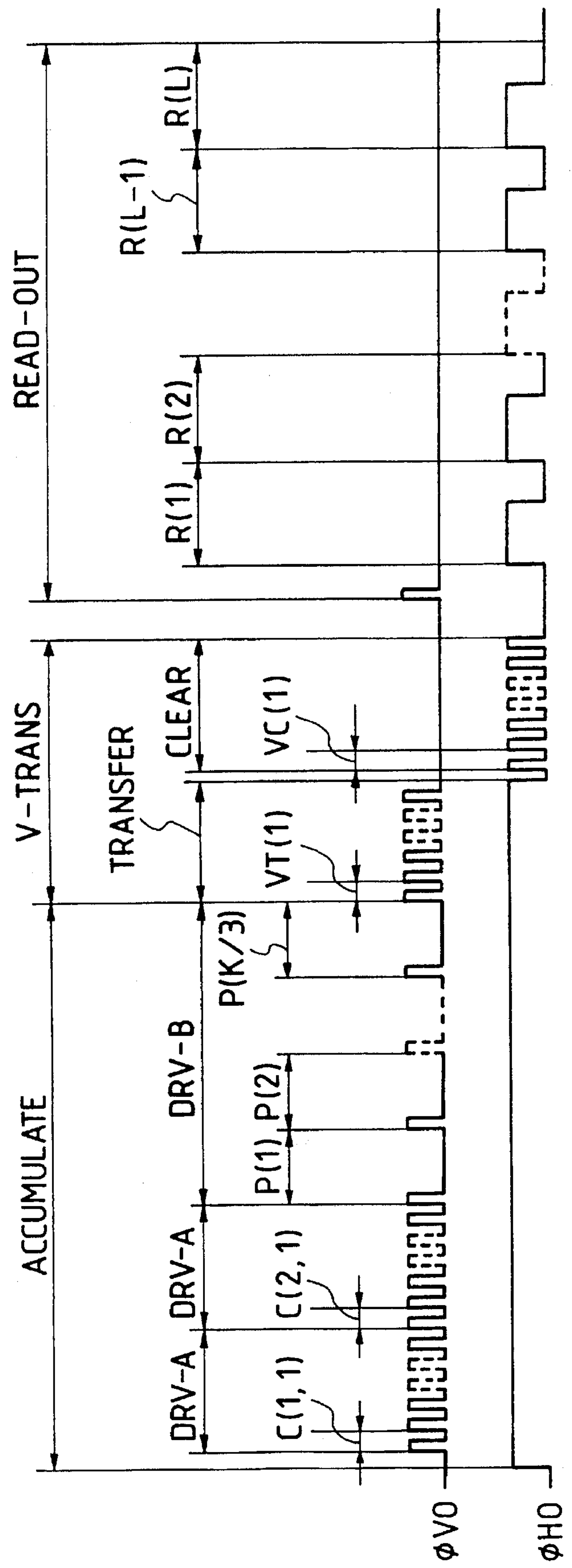
FIG. 14 is a view illustrating the driving timing of the image sensor CCD-EYE according to an embodiment of the present invention.

FIG. 13 is a view showing the drive timing for obtaining the luminance information regarding the SIMGBV2. FIG. 14 is a view showing the drive timing for obtaining the luminance information regarding the SIMGBV3. In these two timings, too, it is possible to obtain the luminance information in the area where the accumulation driving is executed by the time DRV-B in accumulation which is considerably long as compared to the time DRV-A. In other words, because in FIG. 13 and on, the driving DRV-B will be executed in the SIMGBV2, the luminance information in the area SIMGBV2 is obtainable by application of this driving. However, in this case, before the driving DRV-B, the driving DRV-A is executed in advance so that the charge which has remained at the first line before the accumulation is transferred at the interval C(1, 1) to the K/3rd line by the ϕVO output for K/3 times. Then, by the luminance information from the area SIMGBV2 shown in FIG. 13, the luminance information SIMGB5, SIMGB6, SIMGB7, AND SIMGB8 shown in FIG. 8 are calculated.

Likewise, in FIG. 14, the luminance information in the area SIMGBV3 is obtained, and the luminance information SIMGB9, SIMGB10, SIMGB11, AND SIMGB12 are calculated. In this way, it is possible to obtain the luminance information in the twelve areas SIMGB1 TO SIMB12 shown in FIG. 8.

Now, the description will be made of a method for setting the accumulation time and amplification characteristics of the CCD-EYE 14 on the basis of the luminance information of the eyeball which is thus obtained by dividing the detection area of the CCD-EYE 14 into the twelve equal divisions.

Figure 15:
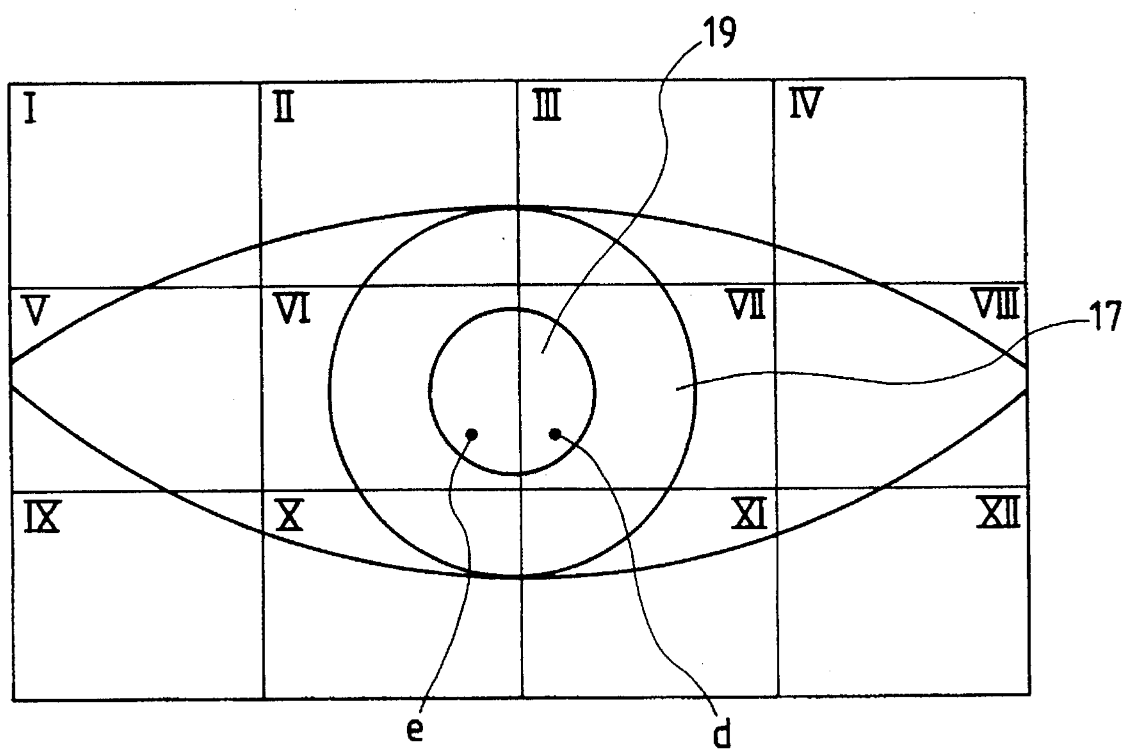
FIG. 15 is a view schematically showing an eyeball image with respect to the detection area.

FIG. 15 is a view showing the state of the eyeball with respect to each of the detection areas which have been divided into the twelve divisions. Each of the detection areas SIMGB1 to 12 in FIG. 8 corresponds to each of the divisions I to XII. Here, the luminance values of the areas VI and VII in the central part of the detection area are defined as $A_1$ and $A_2$; the luminance values of the areas II, III, X, and XI in the intermediate areas 13 above and below the central area A as $B_1$, $B_2$, $B_3$, and $B_4$; and the luminance values of the areas I, IV, V, VIII, IX, and XII in the circumference C of the left- and right-side detection areas as $C_1$, $C_2$, $C_3$, $C_4$, $C_5$, and $C_6$.

Figure 16:
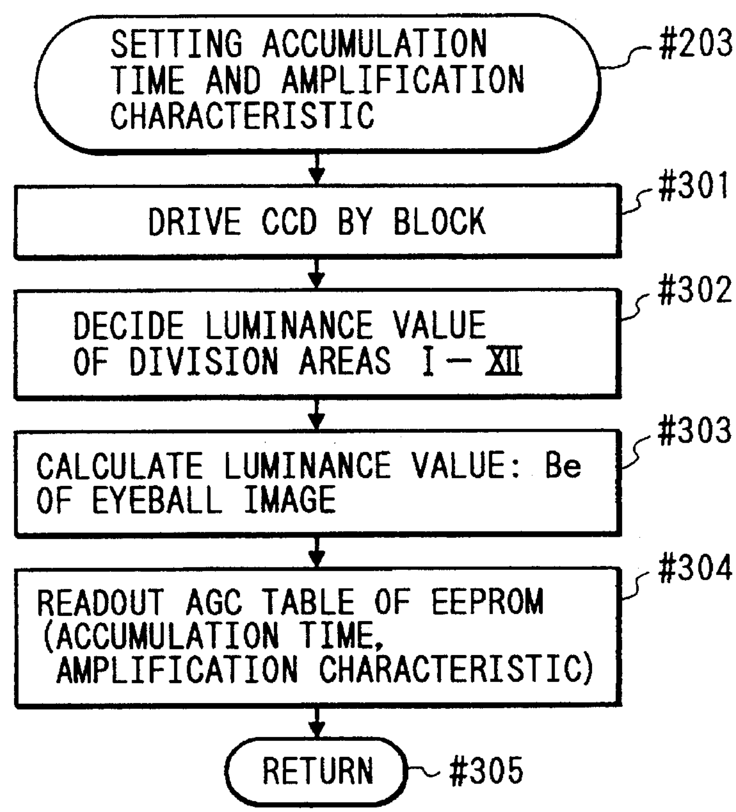
FIG. 16 is a flowchart for setting the accumulation time and amplification characteristics.
Figure 23A:
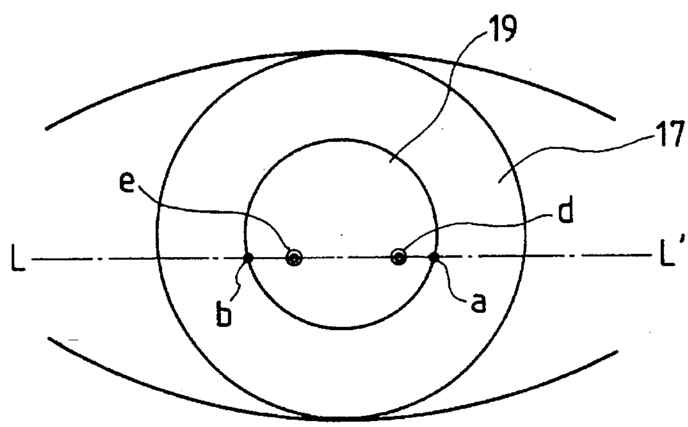
FIGS. 23A and 23B are views showing the output of the eyeball image and the image sensor, respectively.
Figure 23B:
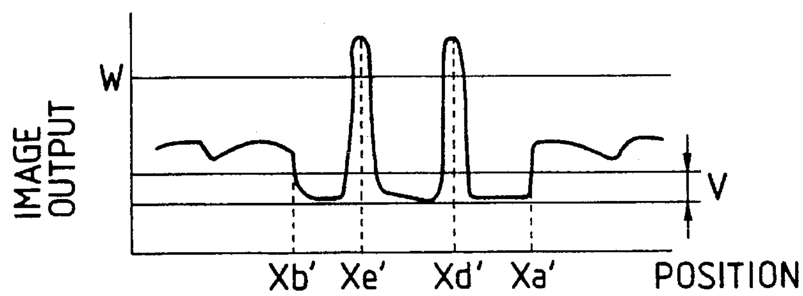

FIG. 16 is a flowchart showing the "accumulation time and amplification characteristics setting" for the CCD in the step S203 where the visual axis is determined in the flowchart shown in FIG. 6. At first, the foregoing CCD block driving (accumulation, transfer, and read-out) is executed (S301), thus defining the luminance value in each of the twelve divisions (S302). FIG. 17 is a view showing the AGC table in which are shown the set values of the accumulation time and amplification characteristics stored in the EEPROM 100*a* of the CPU 100. Then, based upon the luminance value in each of the detection areas I to XII, the luminance value Be of the eyeball image is calculated by a given algorithm (S303). Based upon this Be value, either one of the AGC tables 1 to 8 in the EEPROM 100*a* is selected, and the set values of the accumulation time, amplification factor, and amplification characteristics stored at the respective addresses are read (S304). Then, when the stetting is completed, the process will return from this routine (S305). The CPU 100 executes the accumulation for the CCD-EYE in accordance with the values thus read, and amplifies the sensor output to control the visual axis detection circuit for the output of the image signals. Then, by converting the image signals by the A/D converter, the CPU extracts the Purkinje images and the characteristics of the pupil portion as already described in the steps S205 and S206 in the flowchart shown in FIG. 6. It is then arranged as shown in FIG. 23B that the accumulation time and amplification characteristics are set so that the image signal output at that time can satisfy the following two conditions of the detection algorithm:

(1) The Purkinje images indicate the value higher than the threshold value W at which to determine the detected images as the Purkinje images, and (2) The level of the image output of the iris portion 17 is lower than the threshold value W, and further, the differential threshold value of the image output levels between the iris portion 17 and the pupil 19 is higher than V.

Here, the description will be made of the nonlinear amplification and linear amplification of the amplification characteristics set at the AGC tables 1 to 8. Since the Purkinje images appear as bright points having an extremely strong light intensity due to the nature thereof, the difference between the sensor output from the iris portion and the output of the Purkinje images is remarkably great when photographing in the interior of a room or in the shade where the influence of the external light is small, and the sensor output from the Purkinje images is saturated. Also, as the output of the Purkinje images itself tends to vary greatly as its inherent properties, there are some cases that it is impossible to detect the iris portion and the Purkinje images using the same sensor output of the eyeball at the same time.

Figure 18:
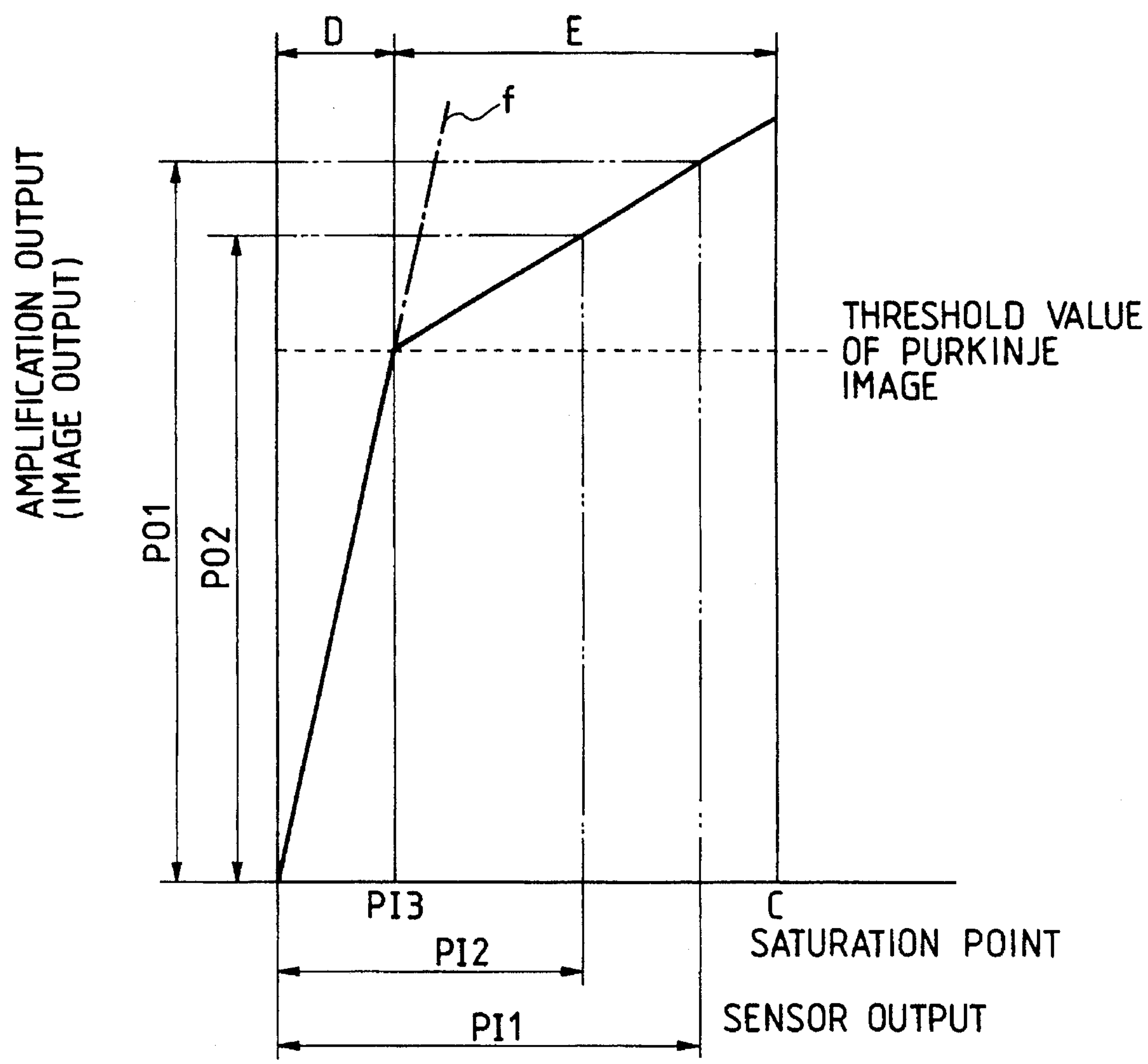
FIG. 18 is a view showing the amplification characteristics of the image sensor output.

Now, FIG. 18 is a characteristic diagram showing the state that the output of the image sensor is being amplified. As shown in FIG. 18, the sensor output is non-linearly amplified, and then, the detection level of the threshold value W of the Purkinje images is set at the point where the amplification factor is great. In this way, the foregoing problem is solved. More specifically, in FIG. 18, the amplification factor in the area D in which the sensor output is small is set at a larger value, approximately 10 to 20 times, and in the area E in which the sensor output is great, the amplification factor is set at a smaller value, approximately one to two times. Hence, even if the image sensor output varies from PI1 to PI2, the output of an image to be detected varies only from PO1 to PO2. In other words, even when the sensor output changes at a ratio of PI2/PI1, the image output changes at a ratio of only PO2/PO1, thus making the relative ratio of variation small. Then, by setting the detection level of the threshold value of the Purkinje images close to the changing point between the D area and E area, it is possible to obtain the output of the image signals which does not vary much, and to detect the Purkinje images stably if only the sensor output for the Purkinje images is PI3 or more. The dashed line f represents the linear characteristic having no variable points, and the amplification factor is always constant. In this respect, the numeral values showing the amplification factors represent the amplification factors in the D area portion in FIG. 18.

Also, what features the AGC table 1 to 8 is to make it possible to determine the accumulation time (Gain), amplification factor, and amplification characteristics as a set, which serves to curtail the number of the tables.

Further, the foregoing non-linear characteristics is switched over to the linear characteristics when the eyeball luminance Be becomes more than a certain specific value (more than 12 in the present embodiment). This is because the relative ratio of the image output of the Purkinje images becomes small with respect to the iris portion when the luminance of the eyeball image becomes considerably brighter, the accumulation time, shorter, and the amplification factor, smaller than when the luminance of the eyeball image is dark. In order to complement this, the characteristics are switched over from the non-linear to the linear so that the image output of the Purkinje images is made relatively higher to make the detection easier.

Figure 19:
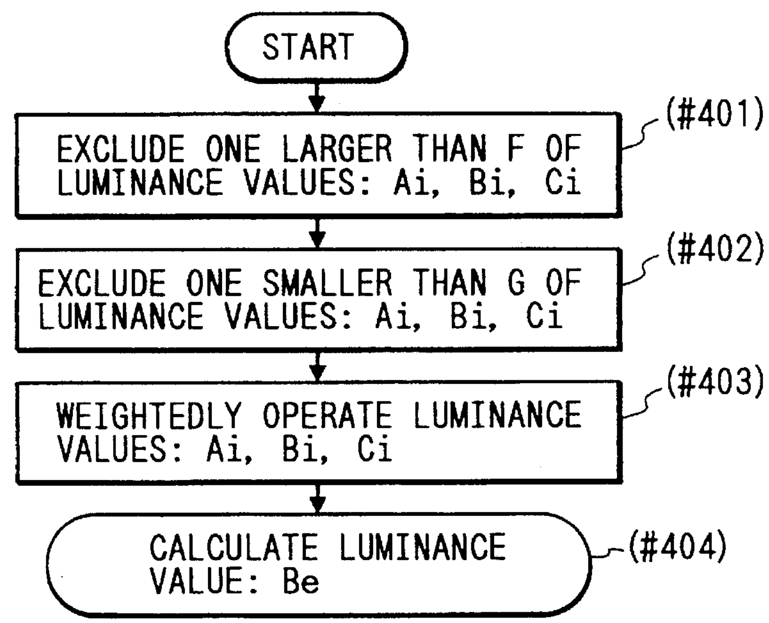
FIG. 19 is a flowchart showing the algorithm which is used in one embodiment to obtain the eyeball luminance.

Subsequently, in conjunction with FIG. 19, the description will be made of the algorithm whereby to obtain the eyeball image value Be on the basis of the luminance value in each of the divided areas I to XII (S303). At first, anticipating that among the luminance values $A_1$, $A_2$, $B_1$, $B_2$, $B_3$, $B_4$, $C_1$, $C_2$, $C_3$, $C_4$, $C_5$, and $C_6$, those having an extreme brightness should be ghost due to the external light, the luminances which are greater than the threshold value F are excluded (S401). Likewise, those having an extreme darkness are interpreted as presenting a dark interior of a room where no eyeball is present (no image being present), and the luminances which are smaller than the threshold value G are excluded (S402).

Now, as clear from FIG. 15, when looking in a finder, it is easiest to observe the finder when the pupil is placed substantially in the center thereof. Generally, therefore, it is most often that the iris portion is the largest in the central part A of the detection area, and then, the iris portion is the second largest in the intermediate parts B. In the present embodiment, therefore, given the average of the luminance values of the A part except the luminance information excluded in the steps S401 and S402 as [Ai], the average of the luminance values of the B part as [Bi], and the average luminance value of the C part as [Ci], the following operation is executed (S403):

$$Be=([Ai]\times3+[Bi]\times2+[Ci]\times1)/6 \quad \ldots (6)$$

Thus, a large weight is given to the central part A, a slightly large weight to the intermediate part B, and a small weight to the circumferential part C. In this way, the luminance value of the eyeball portion is determined. With this, the algorithm in the step S303 is completed (S404). In this respect, those values greater than the threshold value F and smaller than the threshold value G are excluded in the steps S401 and S402, but it may be possible to replace the threshold values F and G with each of the luminance values instead of excluding them.

With this method, it is possible to determine the brightness of the eyeball image as well as the brightness of the eyeball portion around the iris portion without errors due to the noises of the external light to the eyeball portion.

Figure 20:
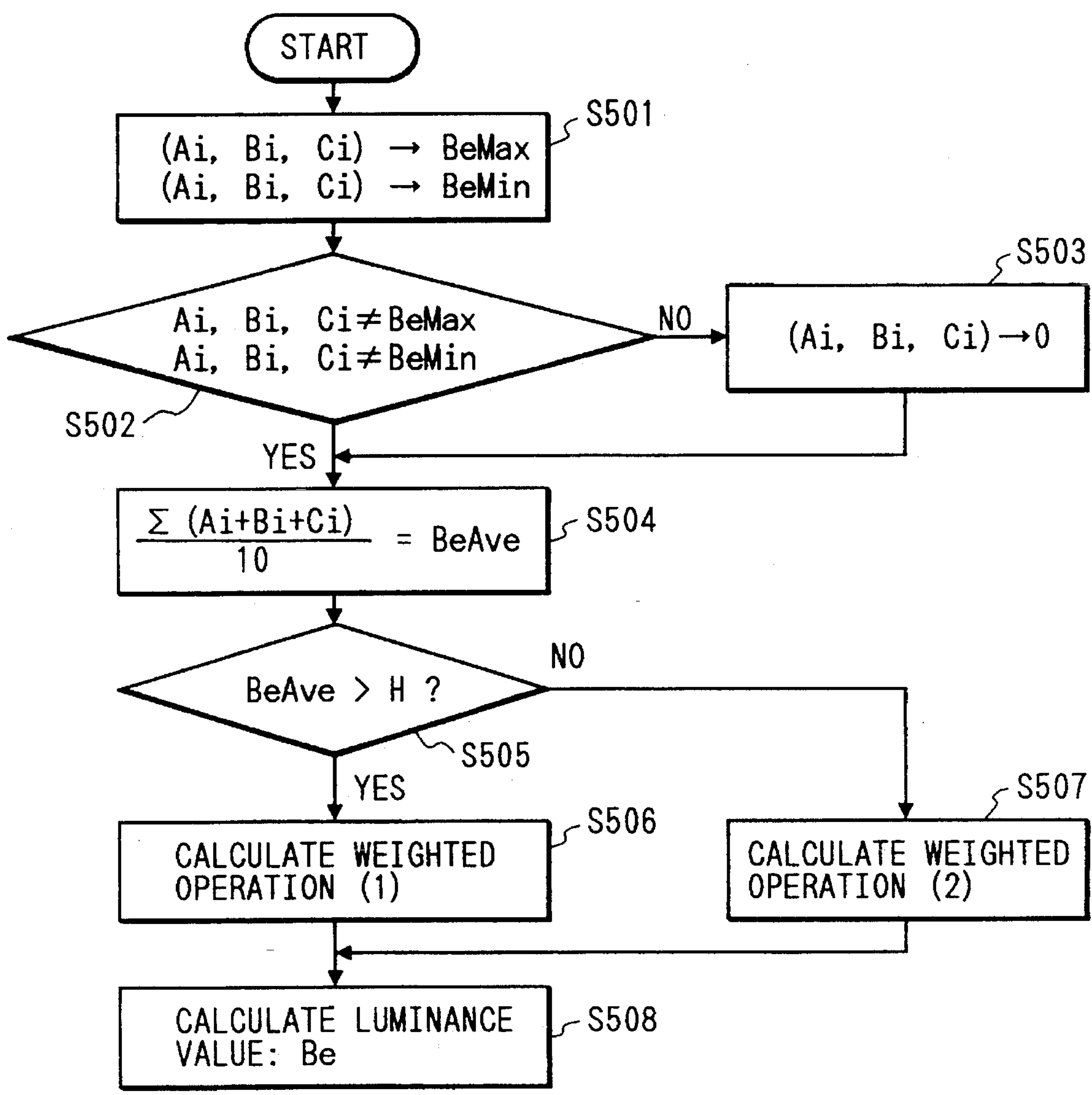
FIG. 20 is a flowchart showing the algorithm which is used in one embodiment to obtain the eyeball luminance.

FIG. 20 is a view showing a second embodiment of the algorithm whereby to determine the luminance value Be. At first, among the luminance values Ai, Bi, and Ci, the maximum value BeMax and the minimum value BeMin are obtained (S501). The two luminance values of either one of the Ai, Bi, and Ci which represent the BeMax and BeMin, respectively, are excluded (S502 and S503). Then, the arithmetic average value BeAve of the remaining ten luminance values is obtained (S504). This BeAve is a reference with which to determine whether the eyeball is in the room, outdoors but in the shade, or outdoors under the direct illumination of the solar light. If the average value BeAve is greater than the threshold value H at which the foregoing determination is made, the weighting operation (1) is executed by the following equation (7) (S506). If the BeAve is less than the threshold value H, the weighting operation (2) is executed by the following equation (8) (S507); (in the present embodiment, H=4 is appropriate, and it is determined that if the BeAve is greater than 4, the eyeball is under the direct illumination of the solar light. If it is less than 4, the eyeball is in the interior of a room):

$$Be=([A]\times6+[B]\times2+[C]\times1)/9 \quad \ldots (7)$$

$$Be=([A]\times1.5+[B]\times1.2+[C]\times1)/3.7 \quad (8)$$

As described above, the luminance value Be of the eyeball is determined (S508) in such a manner that under the solar light in the outdoors, the luminance value in the central part A is greatly weighted, and in the interior of a room, the weight to the luminance value of the central part A is made small so that the luminance value is calculated by the brightness of the eyeball as a whole. Hence, the environment which surrounds the photographer is determined by the size of each of the luminance values, and it is effective to change the weighting equations for the brightness calculation of the eyeball image indoors or outdoors.

Figure 21:
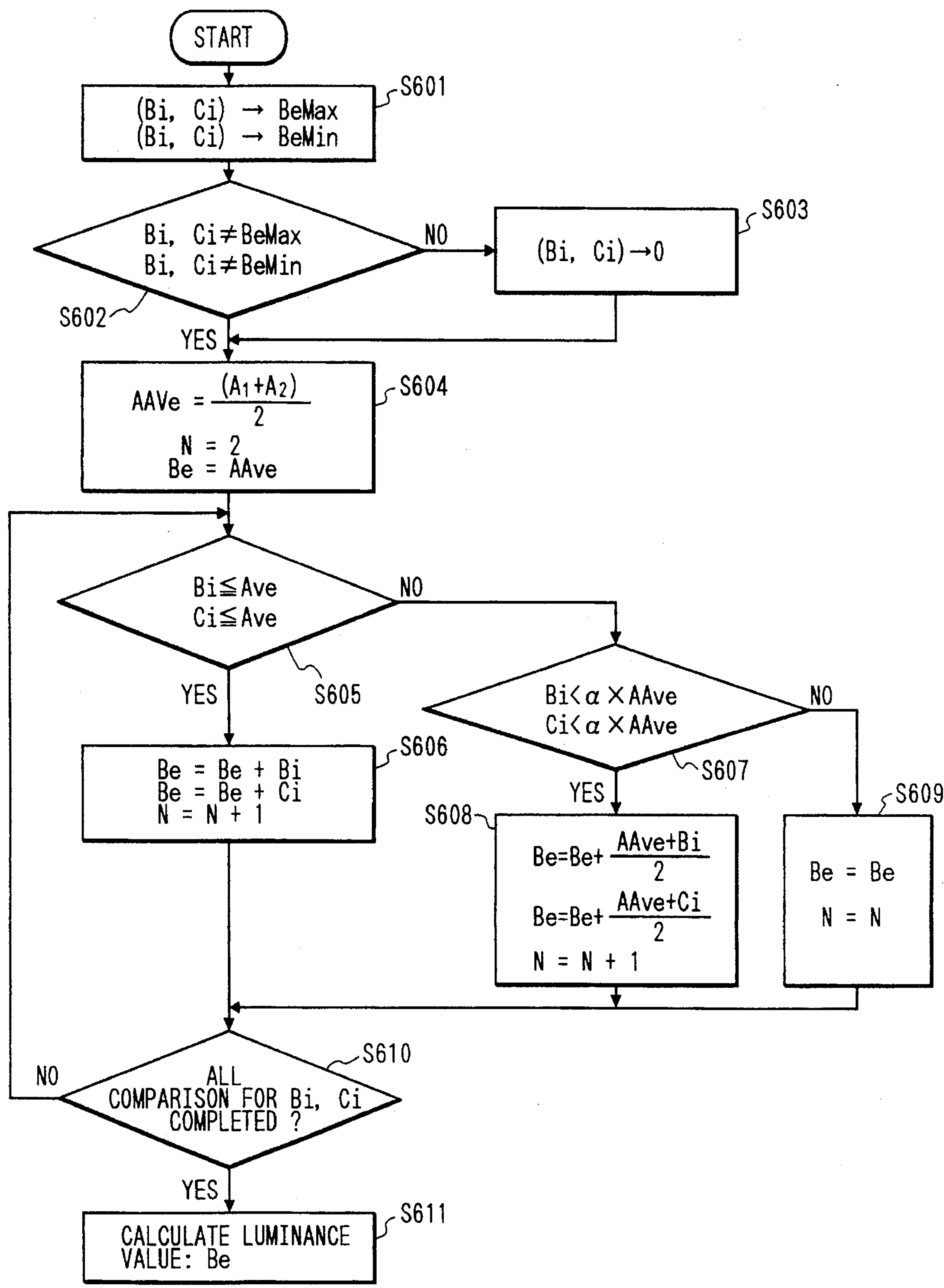
FIG. 21 is a flowchart showing the algorithm which is used in one embodiment to obtain the eyeball luminance.
Figure 22:
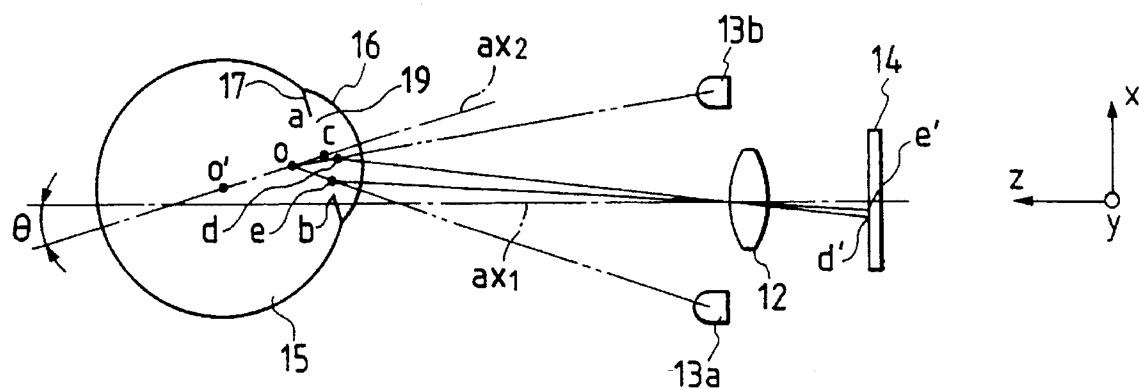
FIG. 22 is a view illustrating the principle of a visual axis detection method.

FIG. 21 is a view showing a third embodiment of the algorithm thereby to determine the luminance value Be. At first, the maximum value BeMax and the minimum value BeMin are obtained from the luminance values Bi and Ci (S601). The two luminance values of either one of Bi and Ci which represent the BeMax and BeMin, respectively, are excluded (S602 and S603). Then, the average value AAve=$(A_1+A_2)/2$ is obtained for the central part A, and as the initial values, N=2 and Be =AAve are provided (S604). Then, the remaining luminance information of the Bi and Ci is compared with the average value AAve, respectively (S605). If the Bi and Ci are smaller, the luminance values of Bi and Ci are added to the Be as they are, and N is counted up by one (S606). If Bi and Ci are greater, the degree of their magnitude from the AAve is determined, and the α×AAve (constant of α>1) and Bi and Ci are compared with each other (S601). In the present embodiment, approximately 2.0 is appropriate. If both the Bi and Ci are greater than the α×AAve, it is determined that they are not the iris portion or pupil portion. Thus, the Bi and Ci are not added to the Be. The N is not counted up, either (S609). If each of the Bi and Ci is smaller than the α×AAve, that is, AAve≦Bi≦α×AAve and AAve≦Ci≦α×AAve, a value arrived at by adding the AAve to each of the Bi and Ci and divided by two, namely, the value weighted by the AAve, is added to the Be; the N is also counted up by one (S608).

After either one of the steps S606, S608 and S609 has been processed, it is determined whether or not all the comparisons of the Bi and Ci are completed. If not completed, the process will return to the step S605 to repeat the procedures in accordance with the foregoing flowchart. If completed, the calculation of the luminance Be is assumed to have completed (S611).

The reason why such an algorithm as this is arranged is that if, for example, the position of the eyeball is displaced to the lower part of the detection area, the area where most of the iris portion is detected is displaced to the lower part (areas $B_3$ and $B_4$), thus, although a part of the iris portion is still in the areas of the central part A at that time, no iris portion is in the upper areas $B_1$ and $B_2$ of the intermediate part B at all. Therefore, with the average value AAve of the central part A as the reference, it is determined that if the detected luminance is smaller than that, the probability is high that the iris portion is present, and then, the AAve is added to the operation of the luminance value Be as it is. If the detected luminance is greater than α×AAve, it is determined that such part is not the iris portion. Hence, no AAve value is added to the operation of the luminance value Be. A value is calculated to make it a reference like this, and then, the luminance value in each of the areas is compared with such a reference value in order to change the weighting operations. This method is effective in calculating the brightness of the eyeball image when the eyeball position is displaced.

In this respect, according to the present embodiment, the description has been made centering the contents to the effect that the output level of the eyeball image is made appropriate, but it may be possible to vary the threshold value W and differential threshold value V in response to the luminance value Be of the eyeball image. Also, it is possible to arrange both the signal output level and the threshold values as a matter of course.

In this respect, according to the present embodiment, when the accumulation time and amplification characteristics are set in the step S203 in FIG. 6, the image sensor CCD-EYE 14 is driven for blocks without illuminating the IRED 13 in order to obtain the luminance information of the reflected image of the eyeball only by the component of the external light, but it may be possible to execute the block driving in a state that the IRED 13 is illuminated in view of adjusting the luminous output of the IRED.

As described above, in a visual axis detection apparatus wherein the photographer's visual axis direction is detected by the utilization of the reflected image of the photographer's eyeball, the detection area of the reflected image of the eyeball is divided at least into a plurality of areas for the detection of the luminance information of the reflected image according to the present invention. Therefore, it is possible to detect the brightness of the eyeball portion (iris portion and pupil portion) exactly even when there is a great difference in the luminance of the reflected image as in the outdoor use. Thus, the signal output of the reflected image suitable for the visual axis detection can be obtained. Also, the characteristic points of the eyeball image can be extracted accurately. There is a significant effect, therefore, that it is possible to provide a visual axis detection apparatus having a high degree of completion, which makes a stabilized visual axis detection possible under any environmental conditions which surround a photographer. Also, according to the luminance information of each of the divided areas, the environmental conditions which surround the photographer can be determined to weight each of the luminance information accordingly, hence making it possible to detect the brightness of the eyeball portion still more reliably.

What is claimed is:

1. A control apparatus for photoelectric conversion means comprising:

photoelectric means having a plurality of photoelectric conversion elements for converting light to photoelectric conversion signals and for transferring the photoelectric conversion signals to adjacent photoelectric conversion elements at a set transfer speed; and transfer speed changing means for changing the transfer speed during an accumulation period of said photoelectric conversion means.

2. A control apparatus according to claim 1, wherein said control means slows down the transfer speed for predetermined photoelectric conversion elements among said plurality of photoelectric conversion elements.

3. A control apparatus according to claim 2, wherein said apparatus further comprises read-out control means for reading out the signals of said predetermined photoelectric conversion elements.

4. A control apparatus according to claim 3, wherein said read-out control means clears the signals of the other photoelectric conversion elements.

5. A control apparatus according to claim 3, wherein said apparatus further comprises control means for controlling the accumulation time of said photoelectric conversion means on the basis of the information read out by said read-out control means.

6. A control apparatus according to claim 1, wherein said photoelectric conversion elements are adapted to receive light from an eyeball.

7. A control apparatus according to claim 5, wherein said apparatus further comprises means for executing signal processing for visual axis detection on the basis of the expected number of said photoelectric conversion signals accumulated during the controlled period of the accumulation time.

8. A control apparatus according to claim 3, wherein said apparatus further comprises gain control means for controlling amplification gains of the signals output from said photoelectric conversion means on the basis of the information read out by said readout control means.

9. A visual axis detection apparatus comprising:

light receiving means having a plurality of light receiving areas for receiving light from an eyeball, wherein each light receiving area produces luminous outputs;

evaluation means for evaluating the luminance state of the eyeball on the basis of the luminous outputs from each of the light receiving areas, said light receiving means further comprising means for determining output characteristics of the light received by said light receiving means on the basis of the evaluation by said evaluation means, and detection means for detecting a visual axis on the basis of the output characteristics of the received light.

10. A visual axis detection apparatus according to claim 9, wherein said apparatus further comprises means for determining amplification characteristics of output of said light receiving means on the basis of the evaluation by said evaluation means.

11. A visual axis detection apparatus according to claim 9, wherein said light receiving means includes an area sensor of a charge accumulation type, and said apparatus further comprises means for determining an accumulation time of said area sensor on the basis of the evaluation by said evaluation means.

* * * * *

UNITED STATES PATENT AND TRADEMARK OFFICE

CERTIFICATE OF CORRECTION

PATENT NO. : 5,541,400

DATED : July 30, 1996

INVENTOR(S) : SHINICHI HAGIWARA, ET AL.

It is certified that error appears in the above-indentified patent and that said Letters Patent is hereby corrected as shown below:

Column 3

Line 23, "$\theta$" should read --$\beta$.

Column 4

Line 44, "detecting" should read --detect--.

Column 7

Line 55, "know" should read --known--.

Column 9

Line 50, "Of" should read --of--.

Column 11

Line 41, "wares" should read --wears--.
Line 52, "the" should be deleted.

Column 12

Line 17, "exceed" should read --excuded--.

Column 13

Line 21, "HSHIT" should read --HSHIFT--.
Line 26, "glooves," should read --grooves,--.
Line 41, "show" should read --shown--.

UNITED STATES PATENT AND TRADEMARK OFFICE

CERTIFICATE OF CORRECTION

PATENT NO. : 5,541,400
DATED : July 30, 1996
INVENTOR(S) : SHINICHI HAGIWARA, ET AL.

It is certified that error appears in the above-indentified patent and that said Letters Patent is hereby corrected as shown below:

Column 14

Line 52, "charged" should read --charge--.

Column 16

Line 34, "stetting" should read --setting--.

Column 20

Line 65, "areas," should read --areas;--.
Line 66, "said light receiving means further comprising" should be deleted.

Column 21

Line 2, "means, and detection" should read --means; and, ¶ detection--.
Line 7, "of" (1st occurrence) should read --of an--.

Signed and Sealed this

Thirty-first Day of December, 1996

Attest:

BRUCE LEHMAN

Attesting Officer

Commissioner of Patents and Trademarks